(12) United States Patent
Derrick

(10) Patent No.: US 12,441,512 B2
(45) Date of Patent: Oct. 14, 2025

(54) COLLAPSIBLE CONTAINER HOLDER FOR PATIENT TRANSPORT APPARATUS

(71) Applicant: Stryker Corporation, Kalamazoo, MI (US)

(72) Inventor: Sean Derrick, Kalamazoo, MI (US)

(73) Assignee: Stryker Corporation, Portage, MI (US)

( * ) Notice: Subject to any disclaimer, the term of this patent is extended or adjusted under 35 U.S.C. 154(b) by 393 days.

(21) Appl. No.: 18/127,924

(22) Filed: Mar. 29, 2023

(65) Prior Publication Data

US 2024/0150074 A1    May 9, 2024

Related U.S. Application Data

(60) Provisional application No. 63/423,643, filed on Nov. 8, 2022.

(51) Int. Cl.
| | |
|---|---|
| *A61B 50/20* | (2016.01) |
| *A61G 5/06* | (2006.01) |
| *B65D 21/08* | (2006.01) |
| *B65D 63/10* | (2006.01) |
| *B65D 85/20* | (2006.01) |

(52) U.S. Cl.
CPC ............ *B65D 21/086* (2013.01); *A61B 50/20* (2016.02); *A61G 5/061* (2013.01); *B65D 63/109* (2013.01); *B65D 85/20* (2013.01)

(58) Field of Classification Search
CPC .... B65D 21/086; B65D 63/109; B65D 85/20; A61B 50/20; A61G 5/061
USPC .......................................................... 280/35
See application file for complete search history.

(56) References Cited

U.S. PATENT DOCUMENTS

| | | | |
|---|---|---|---|
| 4,273,374 A | 6/1981 | Portman | |
| 4,606,521 A | 8/1986 | Williams | |
| 4,696,420 A | 9/1987 | Kulik | |
| 5,259,372 A | 11/1993 | Gross et al. | |
| 5,288,001 A | 2/1994 | Locarno | |
| 5,340,140 A | 8/1994 | Bynum | |
| 6,273,444 B1 * | 8/2001 | Power ................. | A61G 5/1054 280/204 |
| 6,585,206 B2 | 7/2003 | Metz et al. | |
| 6,648,343 B2 * | 11/2003 | Way ...................... | A61G 5/061 280/5.22 |
| 6,966,086 B2 | 11/2005 | Metz et al. | |

(Continued)

OTHER PUBLICATIONS

High Speed Gear, "Soft Taco", 2022, 3 pages.

(Continued)

*Primary Examiner* — John D Walters
*Assistant Examiner* — Hilary L Johns
(74) *Attorney, Agent, or Firm* — Howard & Howard Attorneys PLLC

(57) ABSTRACT

A collapsible holder for receiving an oxygen container is configured to be attached to a support structure of a patient transport apparatus. The holder includes elongated upper and lower panels, a flexible interface extending between the upper panel and the lower panel to form an expandable compartment with an opening for receiving the oxygen container in a lateral direction, and lower sliding strips extending laterally along an interior surface of the lower panel. The lower sliding strips are configured to provide a decreased frictional force relative to the lower panel when receiving the oxygen container within the expandable compartment.

15 Claims, 33 Drawing Sheets

(56) References Cited

U.S. PATENT DOCUMENTS

| | | | |
|---|---|---|---|
| 7,073,765 B2 | 7/2006 | Newkirk | |
| 7,124,456 B2 | 10/2006 | Palmatier et al. | |
| 7,188,855 B1* | 3/2007 | Thomas | A61G 5/10 |
| | | | 280/288.4 |
| 7,636,961 B1 | 12/2009 | Starkey | |
| 7,648,113 B2* | 1/2010 | Johnson | A61G 5/10 |
| | | | 248/315 |
| 7,731,136 B1 | 6/2010 | Chisolm et al. | |
| 7,865,984 B2 | 1/2011 | Merritt | |
| 7,967,174 B2* | 6/2011 | Lauber | B62B 5/002 |
| | | | 280/304.5 |
| 8,100,307 B2 | 1/2012 | Chinn et al. | |
| 8,413,274 B2 | 4/2013 | Weismiller et al. | |
| 8,608,038 B2* | 12/2013 | Katchen | A61G 5/10 |
| | | | 224/407 |
| 8,888,118 B2 | 11/2014 | Paul et al. | |
| 9,144,409 B1 | 9/2015 | Ocel et al. | |
| 9,168,189 B2 | 10/2015 | Ziaylek et al. | |
| 9,265,676 B2 | 2/2016 | Williams | |
| 9,730,846 B2 | 8/2017 | Kutsch et al. | |
| 9,956,139 B2 | 5/2018 | Hesketh | |
| 10,004,654 B2 | 6/2018 | Zerhusen et al. | |
| 10,022,490 B2 | 7/2018 | Blankenship et al. | |
| 10,130,536 B2 | 11/2018 | Roussy et al. | |
| 11,737,559 B2* | 8/2023 | Beck | A47B 96/06 |
| | | | 312/408 |
| 11,938,068 B2* | 3/2024 | Wallace | A61G 5/1032 |
| 11,963,916 B2* | 4/2024 | Tessmer | A61G 5/061 |
| 2003/0132585 A1* | 7/2003 | Way | A61G 5/0883 |
| | | | 280/5.22 |
| 2006/0003809 A1 | 1/2006 | Boling et al. | |
| 2006/0086356 A1* | 4/2006 | Nahavandi | A61M 16/10 |
| | | | 224/407 |
| 2008/0190947 A1* | 8/2008 | Bourgraf | F17C 13/084 |
| | | | 224/407 |
| 2009/0230638 A1* | 9/2009 | Reed | A61G 5/0891 |
| | | | 297/344.22 |
| 2015/0260344 A1 | 9/2015 | Frenal et al. | |
| 2016/0324701 A1 | 11/2016 | Cambridge et al. | |
| 2021/0196536 A1* | 7/2021 | Tessmer | A61G 5/066 |
| 2021/0196539 A1* | 7/2021 | Wallace | A61G 5/0833 |
| 2022/0273097 A1* | 9/2022 | Beck | F25D 25/02 |

OTHER PUBLICATIONS

Stryker, "Emergency Care Catalog", MTX850 EN Rev. 1, SMACC Project No. 2017-15004, 2019, 12 pages.

Stryker, "Stair-Pro Stair Chair Brochure", Mkt Lit-305, 2017, 3 pages.

* cited by examiner

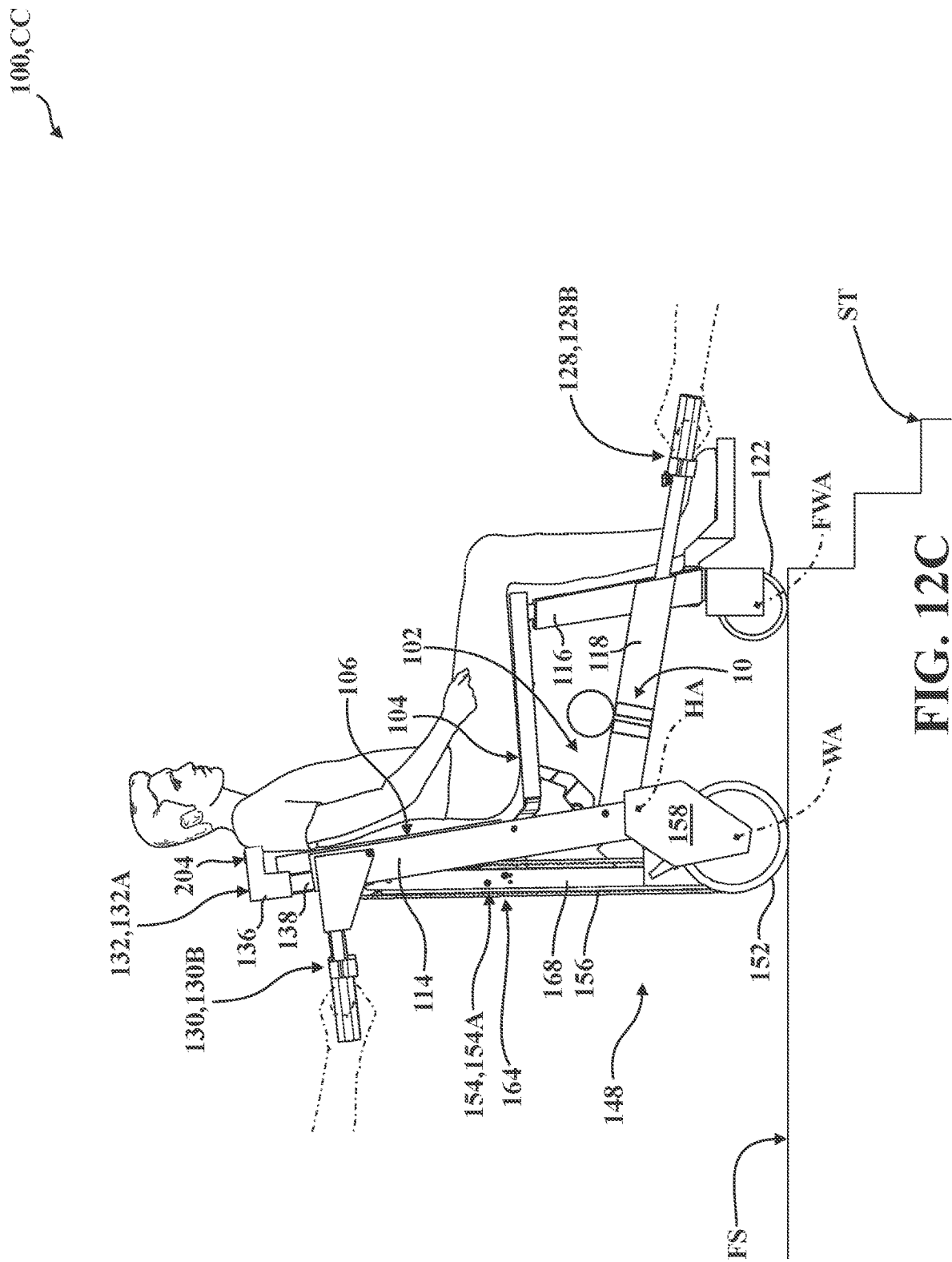

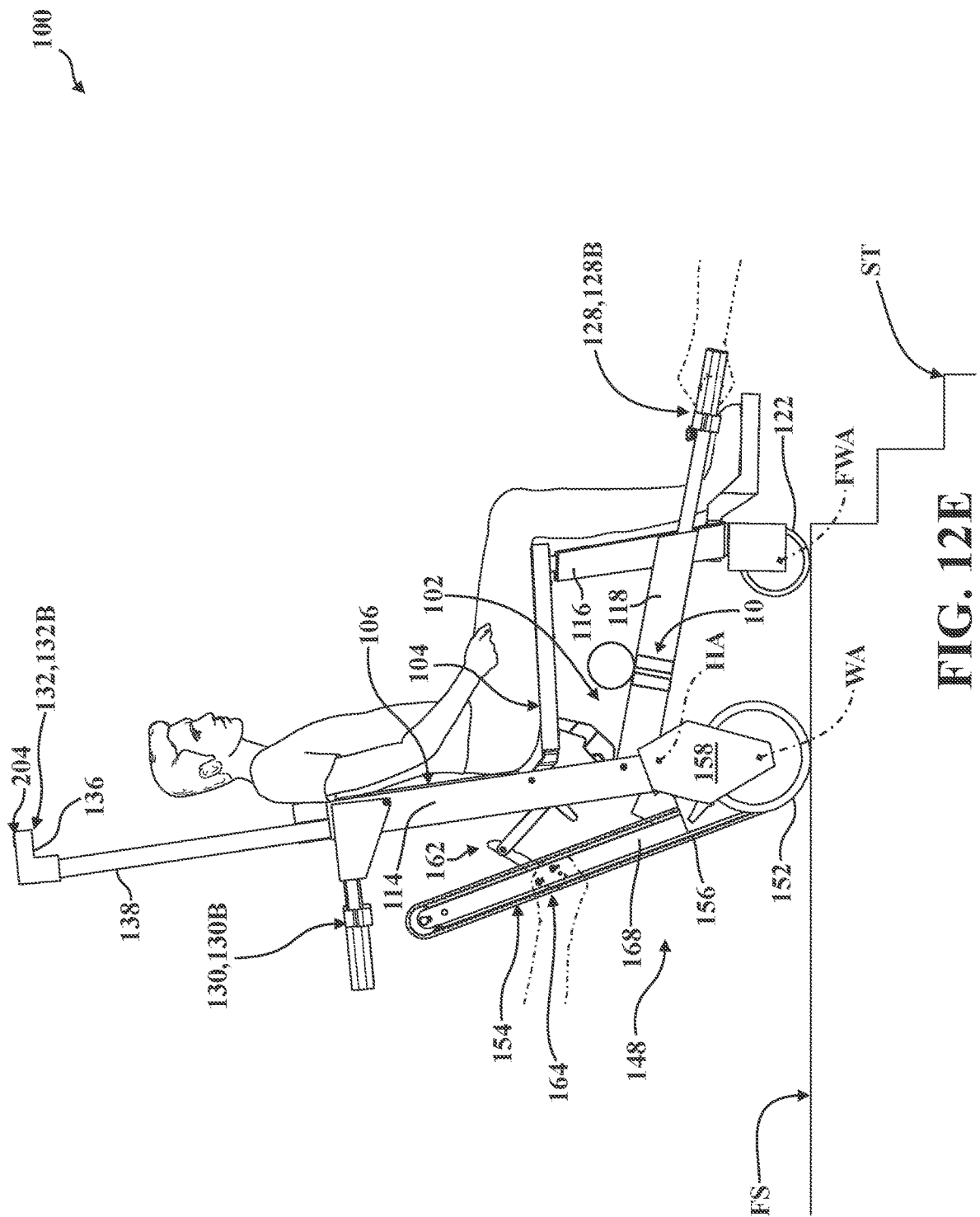

COLLAPSIBLE CONTAINER HOLDER FOR PATIENT TRANSPORT APPARATUS

CROSS-REFERENCE TO RELATED APPLICATION

The subject patent application claims priority to and all the benefits of U.S. Provisional Patent Application No. 63/423,643 filed on Nov. 8, 2022, the disclosure of which is hereby incorporated by reference in its entirety.

BACKGROUND

Patients being transported using a chair or similar apparatus are often accompanied by patient medical supplies such as an oxygen tank. During transport, it is desirable for such supplies to be adequately secured so as to reduce potential for damage and injury. Conventional devices for securing oxygen to a patient transport apparatus often are bulky and configured to be disposed in a position that can interfere with a caregiver's operation of the apparatus, and lack flexibility to accommodate different tank sizes. In addition, such devices frequently do not provide sufficient support when moving over uneven terrain or stairs, and typically need to be removed prior to folding the patient transport apparatus for storage. In addition to the added inconvenience, the process of repeatably removing and reattaching these devices can negatively impact their longevity.

An oxygen container holder designed to overcome one or more of the aforementioned challenges is desired.

SUMMARY

The present disclosure provides a patient transport system. The patient transport system may include: a patient transport apparatus including: a support structure, a seat section and a back section coupled to the support structure and defining a support surface for supporting a patient, a plurality of wheels coupled to the support structure for traversing floor surfaces, and a track assembly extending from the support structure and having a belt for traversing stairs; and a collapsible holder for removably receiving an oxygen container, the holder attached to the support structure and may include: an elongated upper panel and an elongated lower panel, a flexible interface extending between the upper panel and the lower panel to form an expandable compartment with an opening for receiving the oxygen container in a lateral direction, and a plurality of lower sliding strips extending laterally along an interior surface of the lower panel, the lower sliding strips configured to provide a decreased frictional force relative to the lower panel when receiving the oxygen container within the expandable compartment, where the expandable compartment is moveable between: a first expanded state where the upper panel is spaced from the lower panel at a first distance to receive the oxygen container in sliding engagement with the lower sliding strips, and a second expanded state where the upper panel is spaced from the lower panel at a second distance less than the first distance and at least a portion of each of the upper panel and the lower panel abuts the oxygen container.

The present disclosure also provides a collapsible holder for receiving an oxygen container and configured to be attached to a support structure of a patient transport apparatus. The collapsible holder may include: an elongated upper panel and an elongated lower panel, a flexible interface extending between the upper panel and the lower panel to form an expandable compartment with an opening for receiving the oxygen container in a lateral direction, and a plurality of lower sliding strips extending laterally along an interior surface of the lower panel, the lower sliding strips configured to provide a decreased frictional force relative to the lower panel when receiving the oxygen container within the expandable compartment, where the expandable compartment is moveable between: a first expanded state where the upper panel is spaced from the lower panel at a first distance to receive the oxygen container in sliding engagement with the lower sliding strips, and a second expanded state where the upper panel is spaced from the lower panel at a second distance less than the first distance and at least a portion of each of the upper panel and the lower panel abuts the oxygen container.

BRIEF DESCRIPTION OF THE DRAWINGS

Other advantages of the present invention will be readily appreciated as the same becomes better understood by reference to the following detailed description when considered in connection with the accompanying drawings.

FIG. 12C is another right-side plan view of the patient transport system of FIG. 12B, shown having moved closer to the stairs.

FIG. 12E is another right-side plan view of the patient transport system of FIG. 12D, shown with the first caregiver having engaged the deployment lock mechanism to move the track assembly out of the retracted position.

DETAILED DESCRIPTION OF THE EMBODIMENTS

Figure 1:
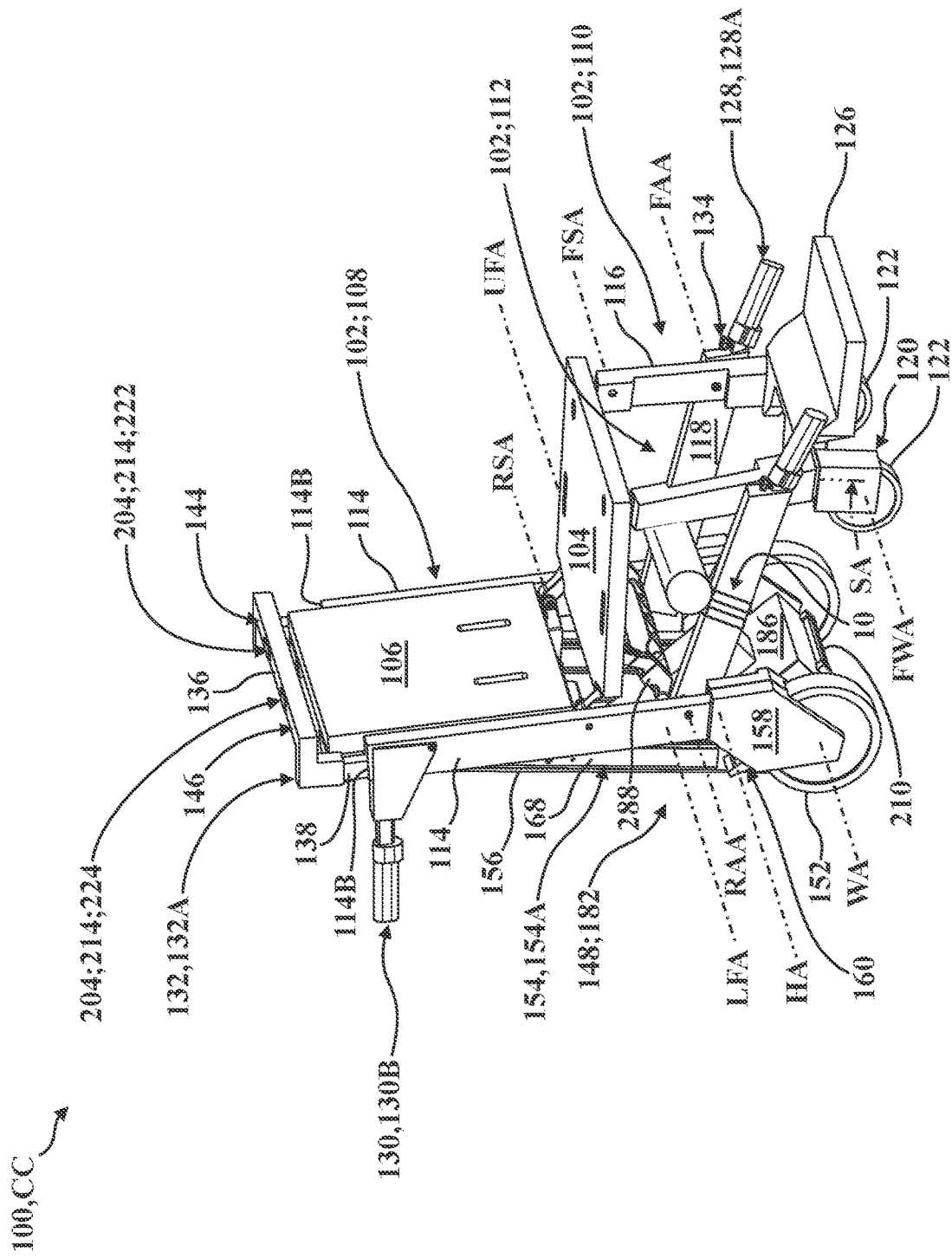
FIG. 1 is a front perspective view of a patient transport system according to the present disclosure including patient transport apparatus, shown arranged in a chair configuration for supporting a patient for transport along a floor surface, and shown having a track assembly disposed in a retracted position, a handle assembly disposed in a collapsed position, and including collapsible oxygen container holder secured to the patient transport apparatus for receiving an oxygen container.

Referring now to the drawings, wherein like numerals indicate like parts throughout the several views, the present disclosure is generally directed a holder 10 for removably receiving an oxygen container, the holder 10 being configured for attachment to a patient transport apparatus 100 configured to allow one or more caregivers to transport a patient. The patient transport apparatus 100 may be realized as a "stair chair" which can be operated in a chair configuration CC (see FIGS. 1, 6A and 16) to transport the patient across ground or floor surfaces FS (e.g., pavement, hallways, and the like), as well as in a stair configuration SC (see FIGS. 2 and 6B) to transport the patient along stairs ST. As will be appreciated from the subsequent description below, the patient transport apparatus 100 of the present disclosure is also configured to be operable in a stowed configuration WC (see FIGS. 5 and 17) when not being utilized to transport patients (e.g., for storage in an ambulance). As shown in the illustrated examples and explained in more detail below, holder 10 when secured to the patient transport apparatus 100 may be moveable between one or more expanded states and a collapsible state, which may enable the patient transport apparatus 100 to be moveable between a patient support configuration (e.g., the chair configuration CC or stair configuration SC) and the stowed configuration WC without removing the holder 10 from the patient transport apparatus 100.

As is best shown in FIG. 1, the patient transport apparatus 100 comprises a support structure 102 to which a seat section 104 and a back section 106 are operatively attached.

The seat section 104 and the back section 106 are each shaped and arranged to provide support to the patient during transport. The support structure 102 generally includes a rear support assembly 108, a front support assembly 110, and an intermediate support assembly 112 that is. The back section 106 is coupled to the rear support assembly 108 for concurrent movement. To this end, the rear support assembly 108 comprises rear uprights 114 which extend generally vertically and are secured to the back section 106 such as with fasteners (not shown in detail). The rear uprights 114 are spaced generally laterally from each other in the illustrated embodiments, and are formed from separate components which cooperate to generally define the rear support assembly 108. However, those having ordinary skill in the art will appreciate that other configurations are contemplated, and the rear support assembly 108 could comprise or otherwise be defined by any suitable number of components. The front support assembly 110 comprises front struts 116 which, like the rear uprights 114, are spaced laterally from each other and extend generally vertically. The intermediate support assembly 112 comprises intermediate arms 118 which are also spaced laterally from each other, and extend between the front support assembly 110 and rear support assembly 108. As discussed in more detail below, the holder 10 may be configured to be releasably secured to the intermediate arms 118. Here too, it will be appreciated that other configurations are contemplated, and the front support assembly 110 and/or the intermediate support assembly 112 could comprise or otherwise be defined by any suitable number of components.

The intermediate support assembly 112 and the seat section 104 are each pivotably coupled to the rear support assembly 108. More specifically, the seat section 104 is arranged so as to pivot about a rear seat axis RSA which extends through the rear uprights 114 (compare FIGS. 5-6A; pivoting about rear seat axis RSA not shown in detail), and the intermediate arms 118 of the intermediate support assembly 112 are arranged so as to pivot about a rear arm axis RAA which is spaced from the rear seat axis RSA and also extends through the rear uprights 114 (compare FIGS. 5-6A; pivoting about rear arm axis RAA not shown in detail). Furthermore, the intermediate support assembly 112 and the seat section 104 are also each pivotably coupled to the front support assembly 110. Here, the seat section 104 pivots about a front seat axis FSA which extends through the front struts 116 (compare FIGS. 5-6A; pivoting about front seat axis FSA not shown in detail), and the intermediate arms 118 pivot about a front arm axis FAA which is spaced from the front seat axis FSA and extends through the front struts 116 (compare FIGS. 5-6A; pivoting about front arm axis FAA not shown in detail). The intermediate support assembly 112 is disposed generally vertically below the seat section 104 such that the rear support assembly 108, the front support assembly 110, the intermediate support assembly 112, and the seat section 104 generally define a four-bar linkage which helps facilitate movement between the stowed configuration WC (see FIG. 5) and the chair configuration CC (see FIG. 6A). While the seat section 104 is generally configured to remain stationary relative to the support structure 102 when operating in the chair configuration CC or in the stair configuration CC according to the illustrated embodiments, it is contemplated that the seat section 104 could comprise multiple components which cooperate to facilitate "sliding" movement relative to the seat section 104 under certain operating conditions, such as to position the patient's center of gravity advantageously for transport. Other configurations are contemplated.

Figure 2:
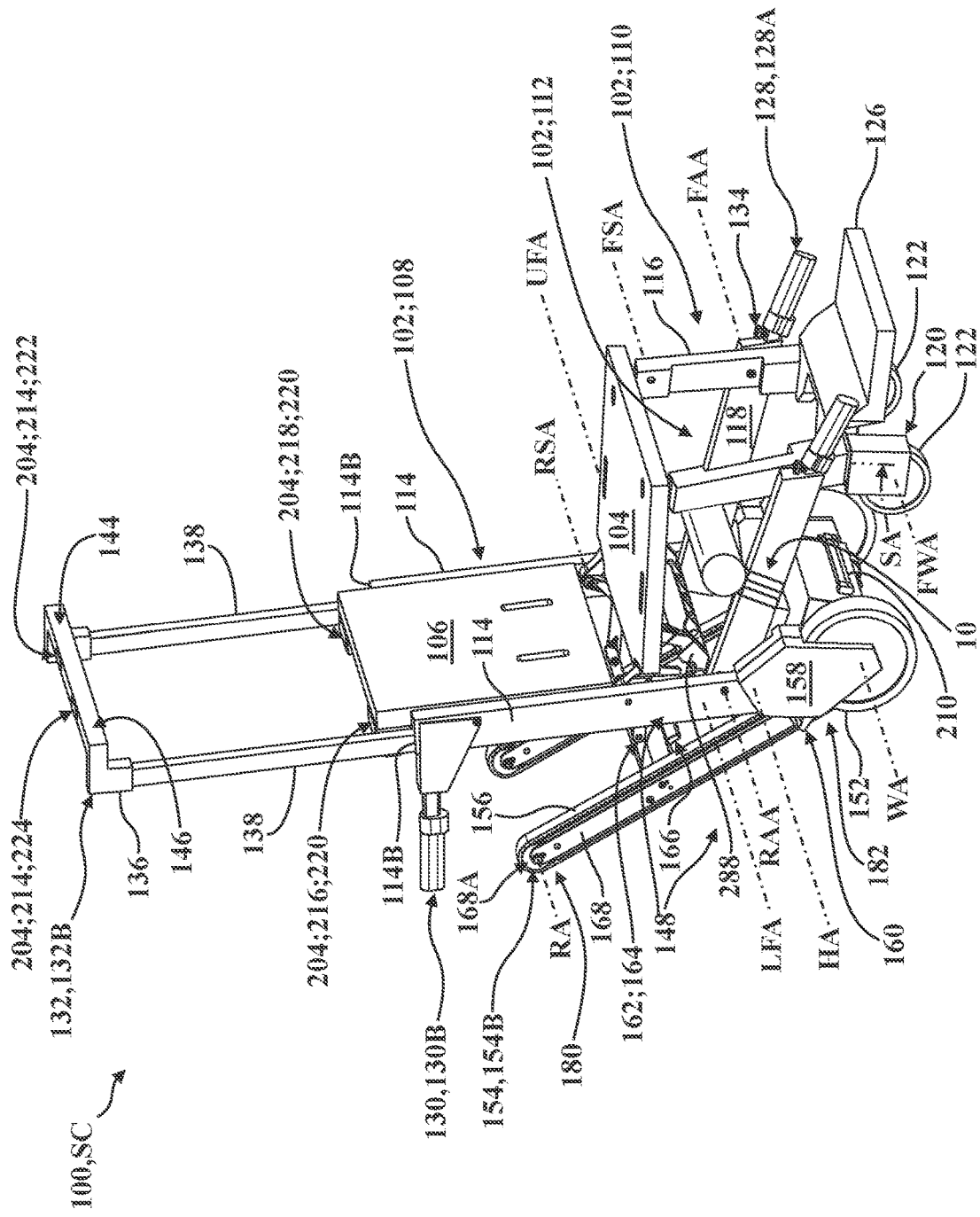
FIG. 2 is another front perspective view of the patient transport system of FIG. 1, with the patient transport apparatus shown arranged in a stair configuration for supporting the patient for transport along stairs, and shown with the track assembly disposed in a deployed position, and with the handle assembly disposed in an extended position.
Figure 3:
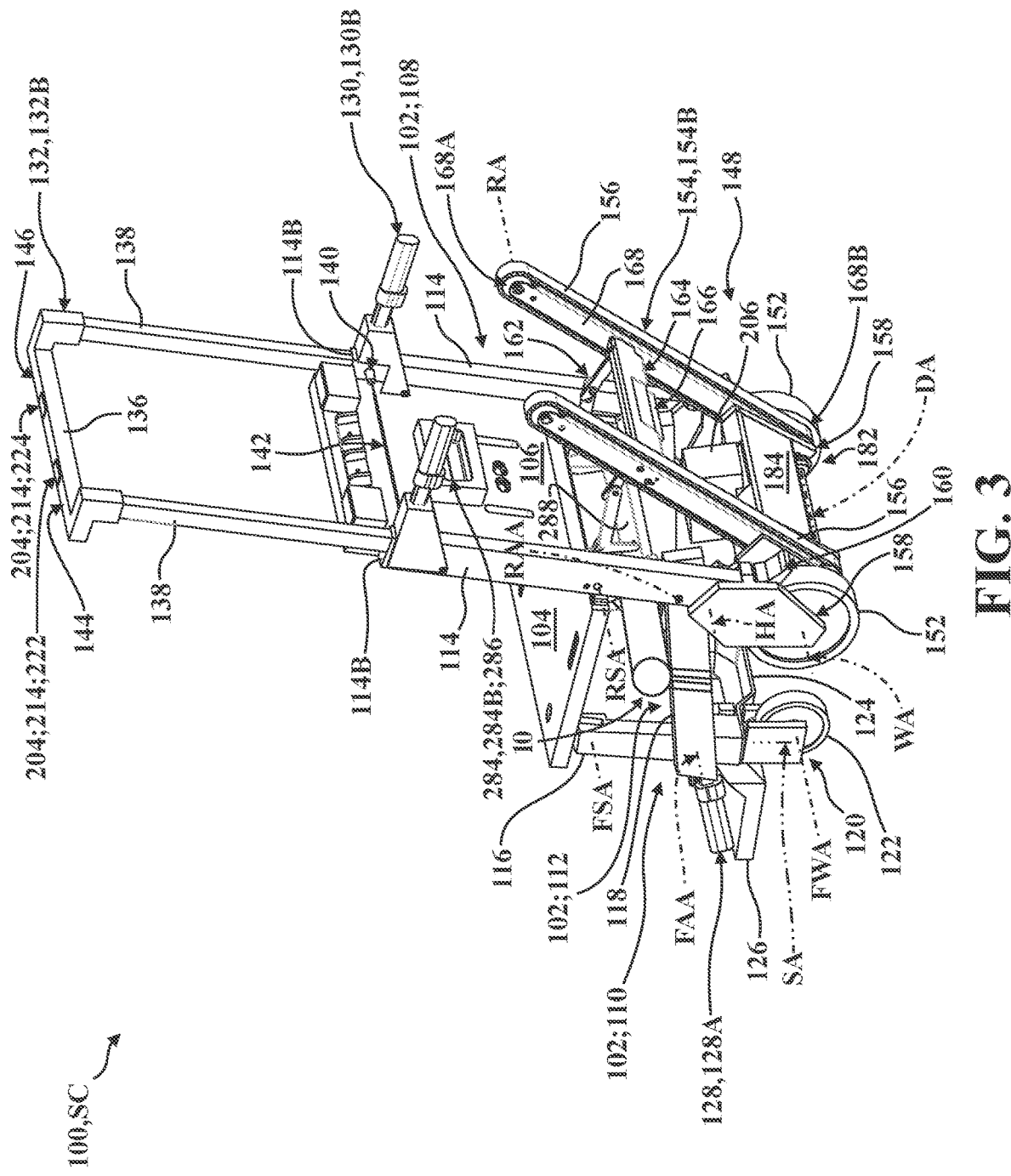
FIG. 3 is a rear perspective view of the patient transport system of FIGS. 1-2, with the patient transport apparatus shown arranged in the stair configuration as depicted in FIG. 2, and shown having an extension lock mechanism, a folding lock mechanism, and a deployment lock mechanism.
Figure 5:
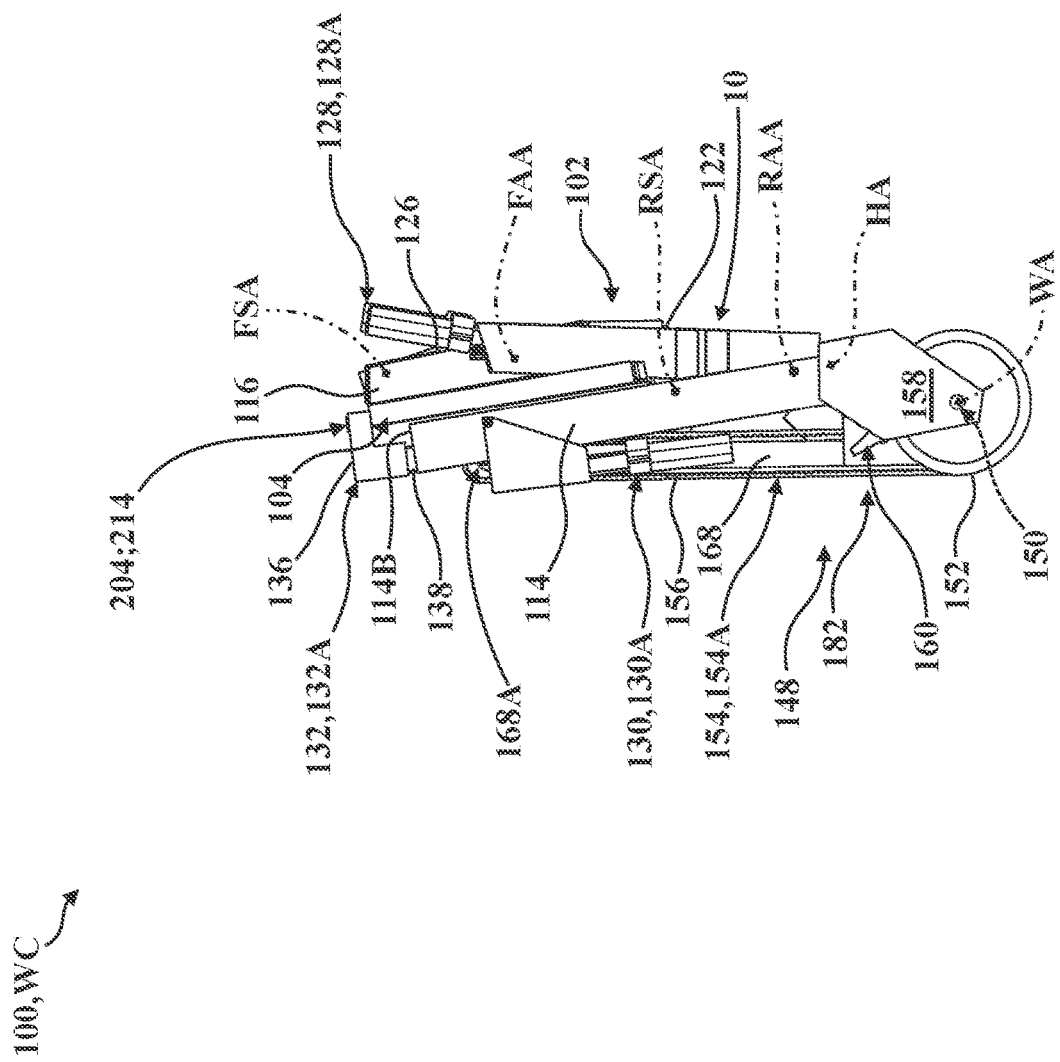
FIG. 5 is a right-side plan view of the patient transport system of FIGS. 1-4, with the patient transport apparatus shown arranged in a stowed configuration maintained by the folding lock mechanism.
Figure 6A:
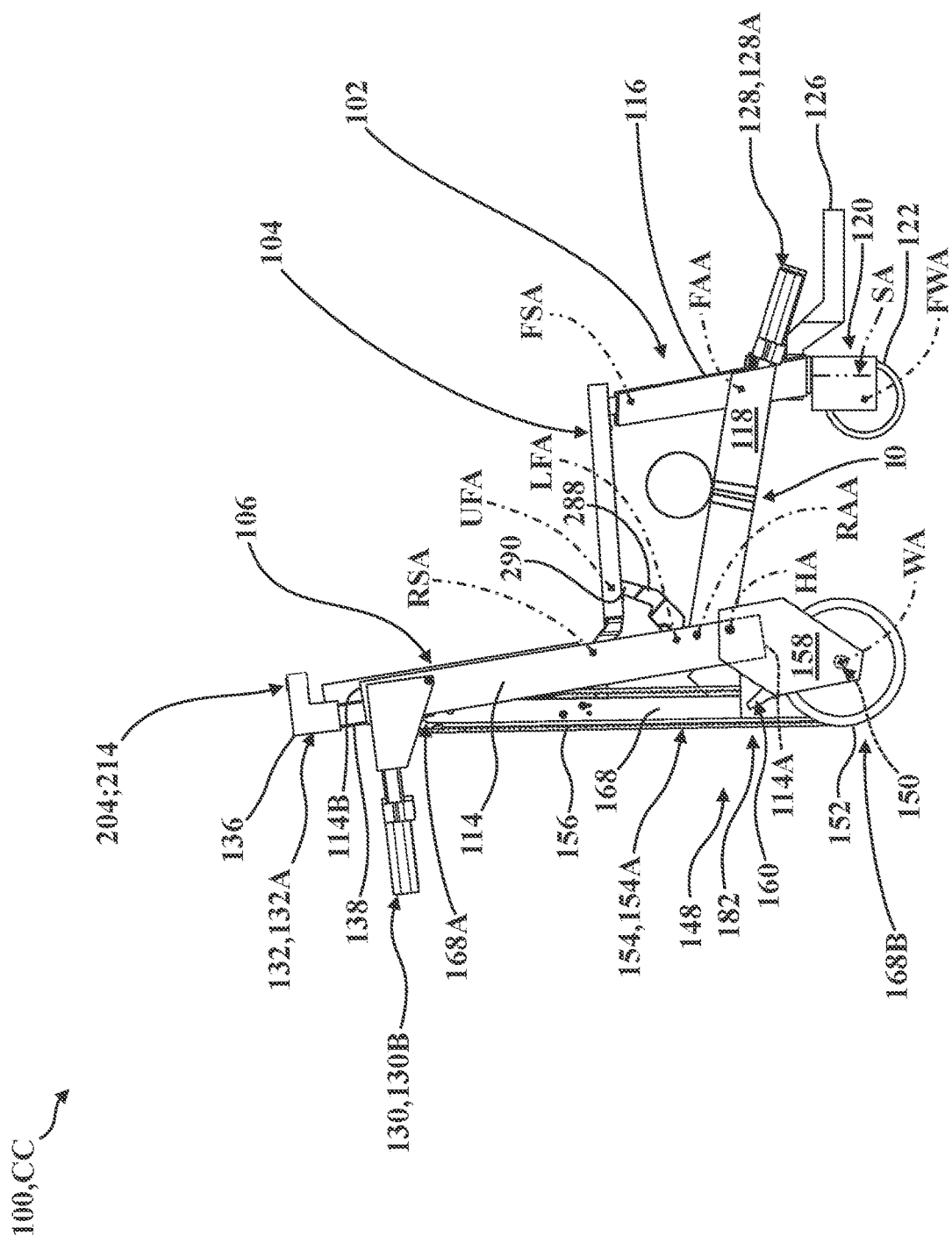
FIG. 6A is another right-side plan view of the patient transport system of FIG. 5, with the patient transport apparatus shown arranged in the chair configuration as depicted in FIG. 1.

Referring now to FIGS. 1-3, the front support assembly 110 includes a pair of caster assemblies 120 which each comprise a front wheel 122 arranged to rotate about a respective front wheel axis FWA and to pivot about a respective swivel axis SA (compare FIGS. 5-6A; pivoting about swivel axis SA not shown in detail). The caster assemblies 120 are generally arranged on opposing lateral sides of the front support assembly 110 and are operatively attached to the front struts 116. A lateral brace 124 (see FIG. 3) extends laterally between the front struts 116 to, among other things, afford rigidity to the support structure 102. Here, a foot rest 126 is pivotably coupled to each of the front struts 116 adjacent to the caster assemblies 120 (pivoting not shown in detail) to provide support to the patient's feet during transport. For each of the pivotable connections disclosed herein, it will be appreciated that one or more fasteners, bushings, bearings, washers, spacers, and the like may be provided to facilitate smooth pivoting motion between various components.

The representative embodiments of the patient transport apparatus 100 illustrated throughout the drawings comprise different handles arranged for engagement by caregivers during patient transport. More specifically, the patient transport apparatus 100 comprises front handle assemblies 128, pivoting handle assemblies 130, and an upper handle assembly 132 (hereinafter referred to as "handle assembly 132), each of which will be described in greater detail below. The front handle assemblies 128 are supported within the respective intermediate arms 118 for movement between a collapsed position 128A (see FIG. 12A) and an extended position 128B (see FIG. 12B). To this end, the front handle assemblies 128 may be slidably supported by bushings, bearings, and the like (not shown) coupled to the intermediate arms 118, and may be lockable in and/or between the collapsed position 128A and the extended position 128B via respective front handle locks 134 (see FIG. 1). Here, a caregiver may engage the front handle locks 134 (not shown in detail) to facilitate moving the front handle assemblies 128 between the collapsed position 128A and the extended position 128B. The front handle assemblies 128 are generally arranged so as to be engaged by a caregiver during patient transport up or down stairs ST when in the extended position 128B. It will be appreciated that the front handle assemblies 128 could be of various types, styles, and/or configurations suitable to be engaged by caregivers to support the patient transport apparatus 100 for movement. While the illustrated front handle assemblies 128 are arranged for telescoping movement, other configurations are contemplated. By way of non-limiting example, the front handle assemblies 128 could be pivotably coupled to the support structure 102 or other parts of the patient transport apparatus 100. In some embodiments, the front handle assemblies 128 could be configured similar to as is disclosed in U.S. Pat. No. 6,648,343, the disclosure of which is hereby incorporated by reference in its entirety.

The pivoting handle assemblies 130 are coupled to the respective rear uprights 114 of the rear support assembly 108, and are movable relative to the rear uprights 114 between a stowed position 130A (see FIG. 5) and an engagement position 130B (see FIG. 6A). Like the front handle assemblies 128, the pivoting handle assemblies 130 are generally arranged for engagement by a caregiver during patient transport, and may advantageously be utilized in the engagement position 130B when the patient transport apparatus 100 operates in the chair configuration CC to transport the patient along floor surfaces FS. In some embodiments, the pivoting handle assemblies 130 could be configured similar to as is disclosed in U.S. Pat. No. 6,648,343, previously referenced. Other configurations are contemplated.

Figure 12A:
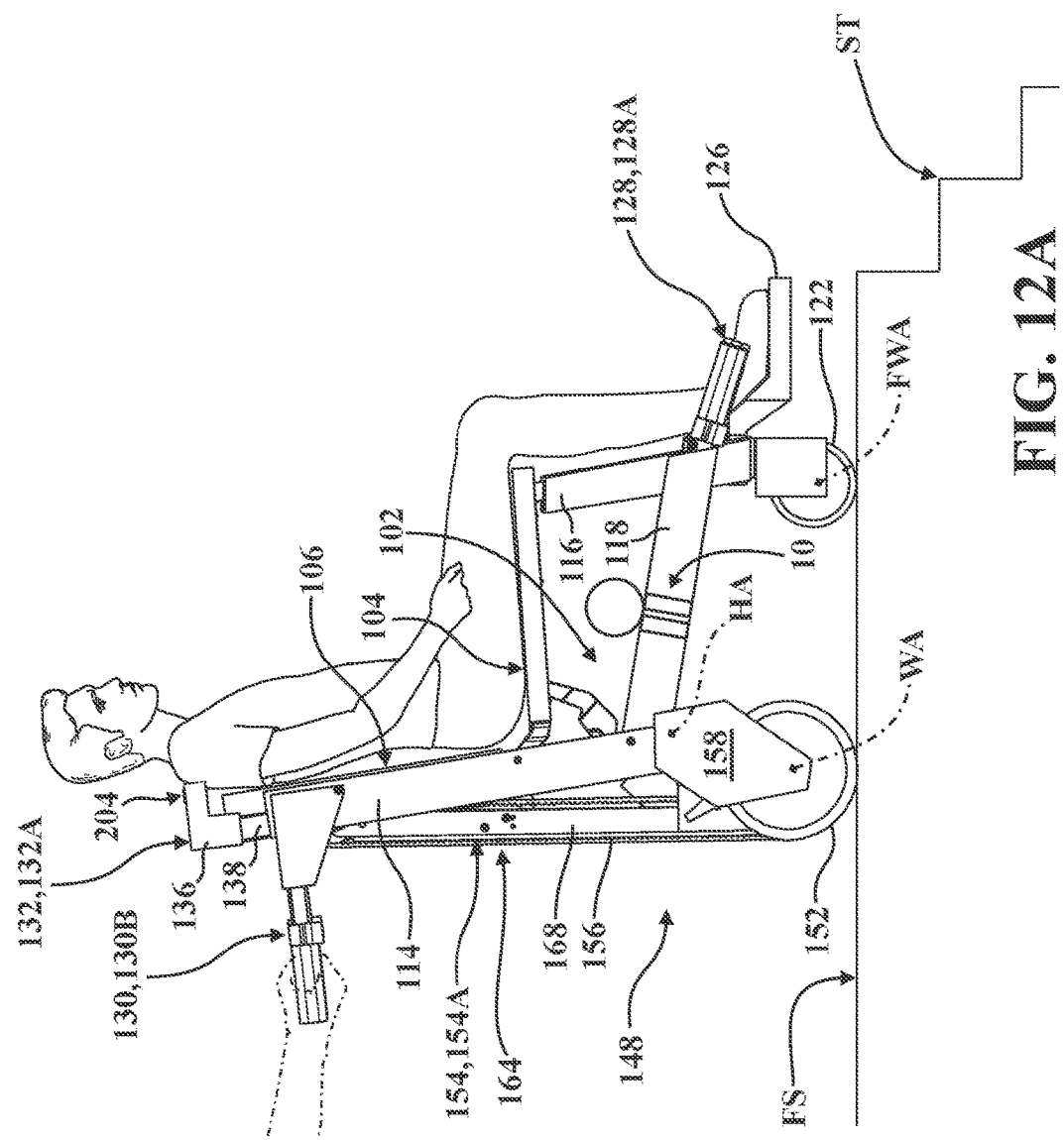
FIG. 12A is a right-side plan view of the patient transport system of FIGS. 1-11D, shown supporting a patient in the chair configuration on a floor surface adjacent to stairs, and shown with a first caregiver engaging a pivoting handle assembly.
Figure 12B:
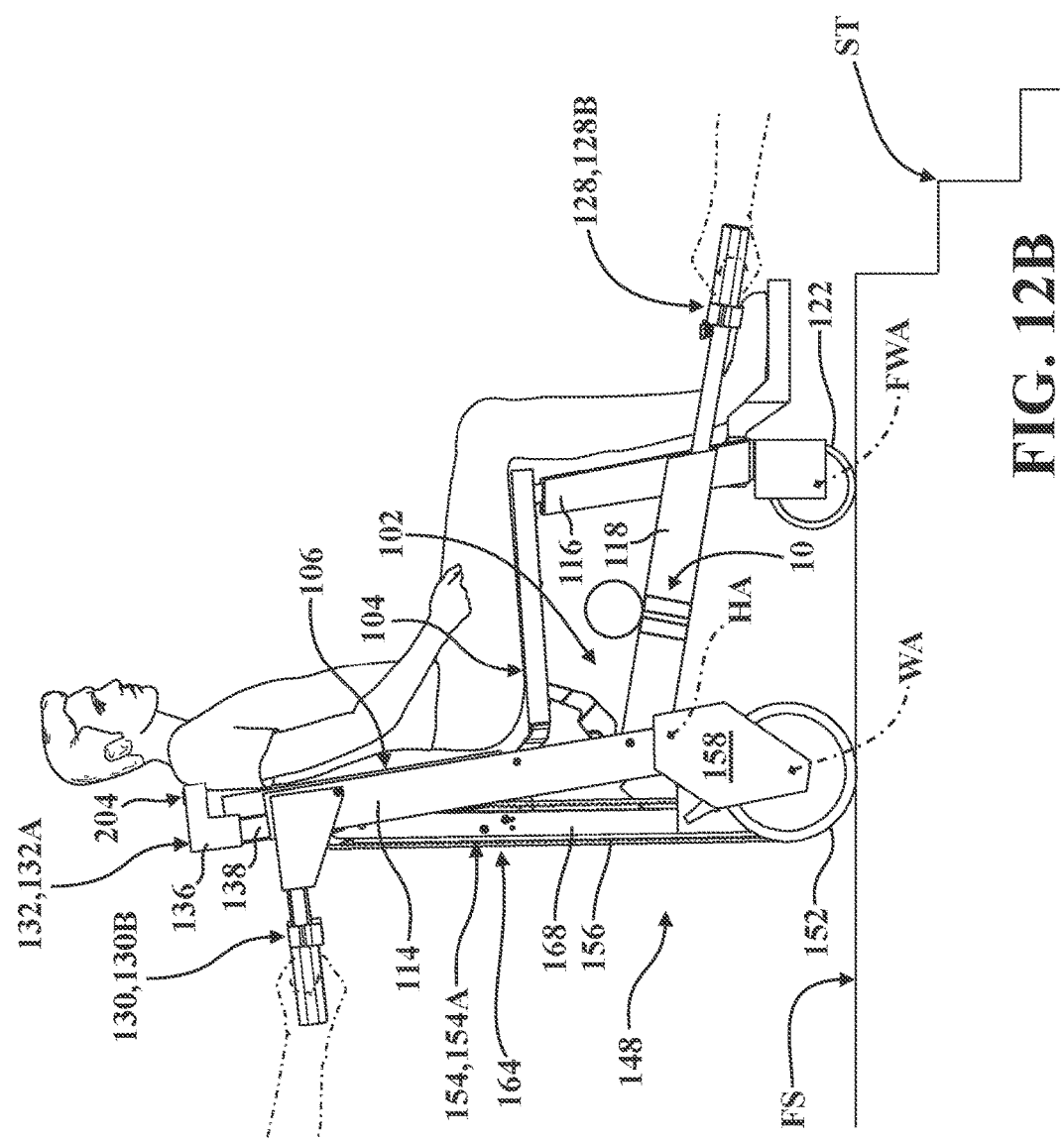
FIG. 12B is another right-side plan view of the patient transport system of FIG. 12A, shown with a second caregiver engaging a front handle assembly in an extended position.
Figure 12D:
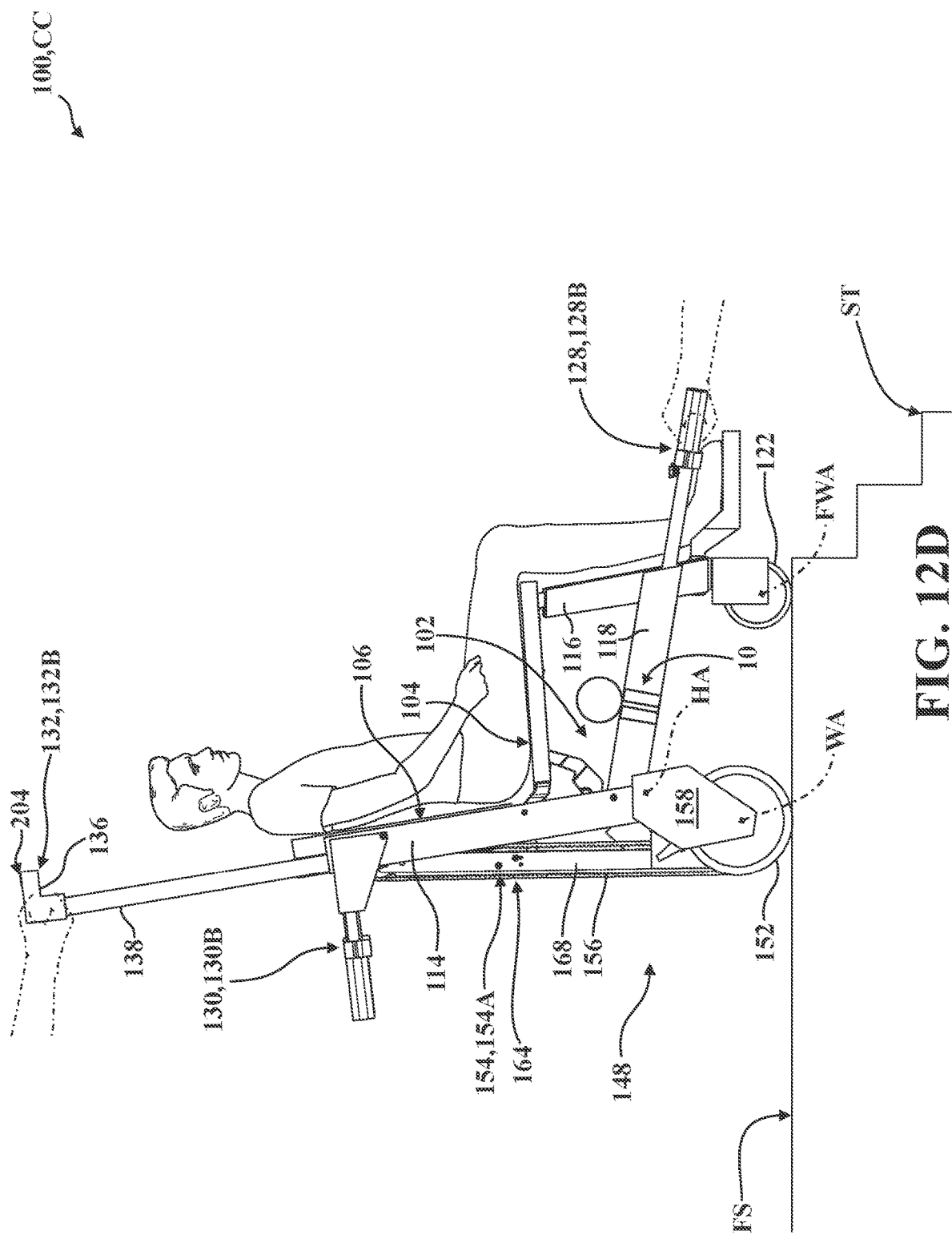
FIG. 12D is another right-side plan view of the patient transport system of FIG. 12C, shown with the first caregiver engaging the handle assembly in the extended position.

The handle assembly 132 is also coupled to the rear support assembly 108, and generally comprises an upper grip 136 operatively attached to extension posts 138 which are supported within the respective rear uprights 114 for movement between a collapsed position 132A (see FIGS. 1 and 12C) and an extended position 132B (see FIGS. 2 and 12D). To this end, the extension posts 138 of the handle assembly 132 may be slidably supported by bushings, bearings, and the like (not shown) coupled to the rear uprights 114, and may be lockable in and/or between the collapsed position 132A and the extended position 132B via an extension lock mechanism 140 with an extension lock release 142 arranged for engagement by the caregiver. As is best shown in FIG. 3, the extension lock release 142 may be realized as a flexible connector which extends generally laterally between the rear uprights 114, and supports a cable connected to extension lock mechanisms 140 which releasably engage the extension posts 138 to maintain the handle assembly 132 in the extended position 132B and the collapsed position 132A (not shown in detail). Here, it will be appreciated that the extension lock mechanism 140 and/or the extension lock release 142 could be of a number of different styles, types, configurations, and the like sufficient to facilitate selectively locking the handle assembly 132 in the extended position 132B. In some embodiments, the handle assembly 132, the extension lock mechanism 140, and/or the extension lock release 142 could be configured similar to as is disclosed in U.S. Pat. No. 6,648,343, previously referenced. Other configurations are contemplated.

Figure 12F:
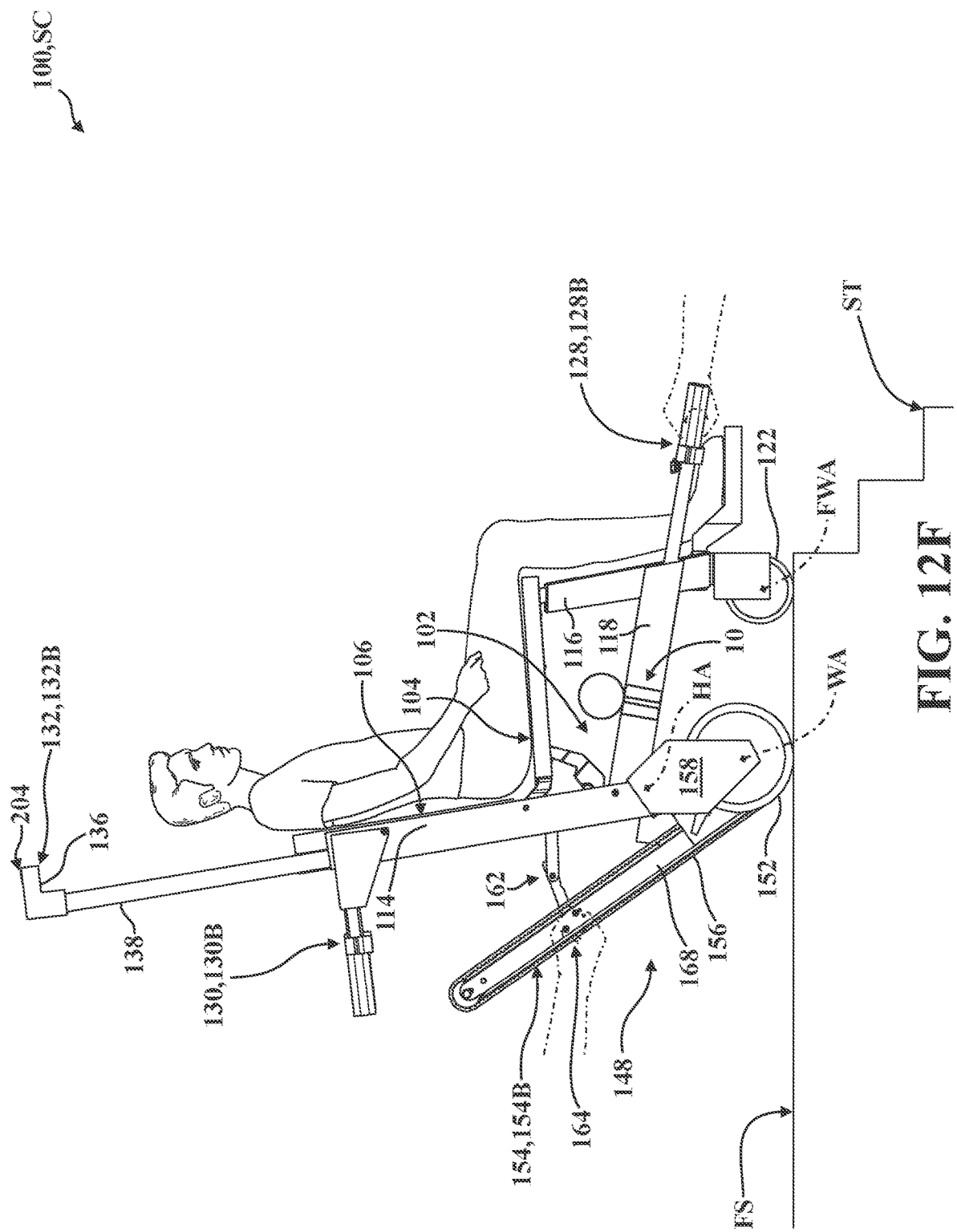
FIG. 12F is another right-side plan view of the patient transport system of FIG. 12E, shown supporting the patient in the stair configuration with the track assembly in the deployed position.
Figure 12G:
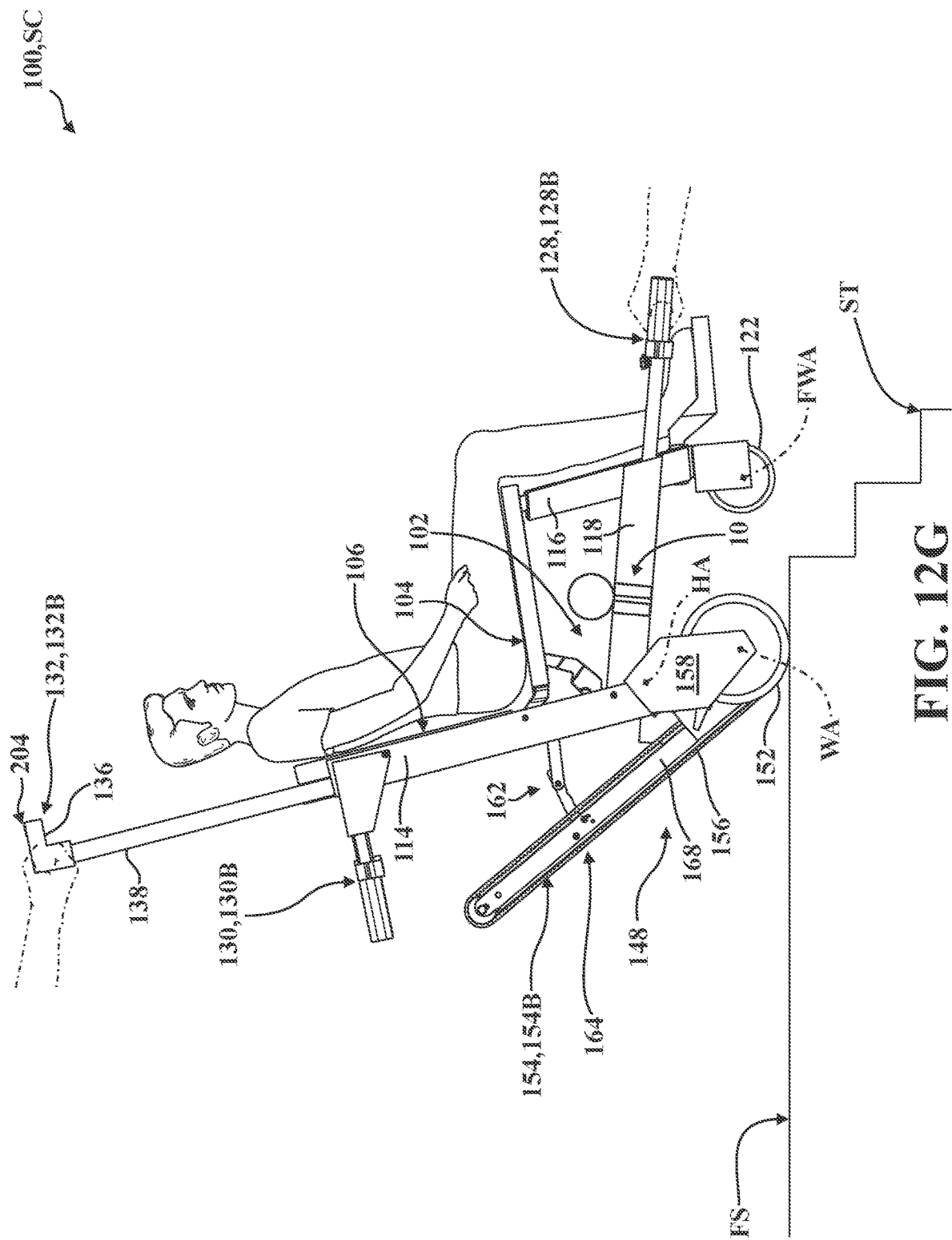
FIG. 12G is another right-side plan view of the patient transport system of FIG. 12F, shown having moved towards the stairs for descent while supported by the first and second caregivers.
Figure 12H:
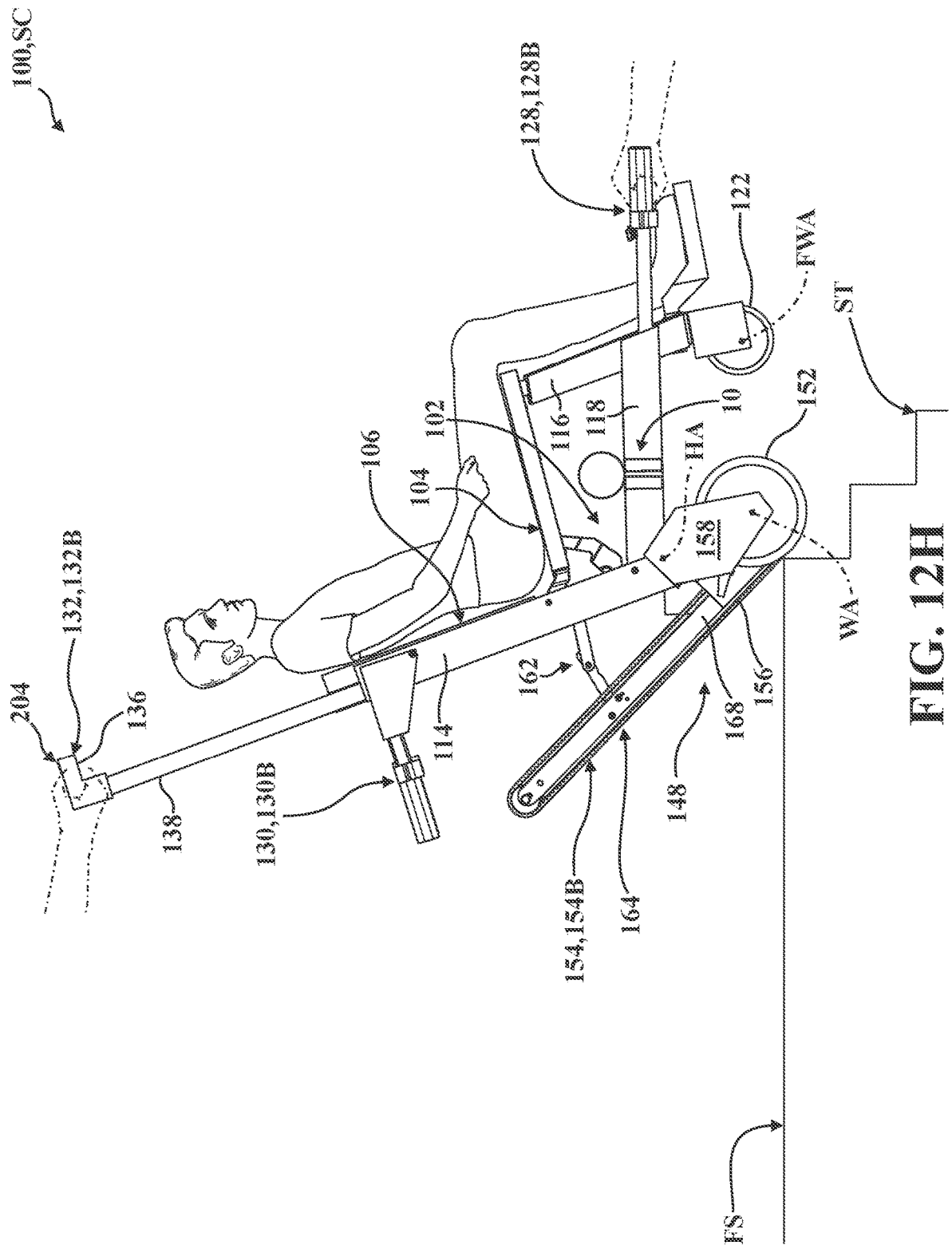
FIG. 12H is another right-side plan view of the patient transport system of FIG. 12C, shown having moved initially down the stairs for descent to bring a belt of the track assembly into contact with the stairs while still supported by the first and second caregivers.
Figure 12I:
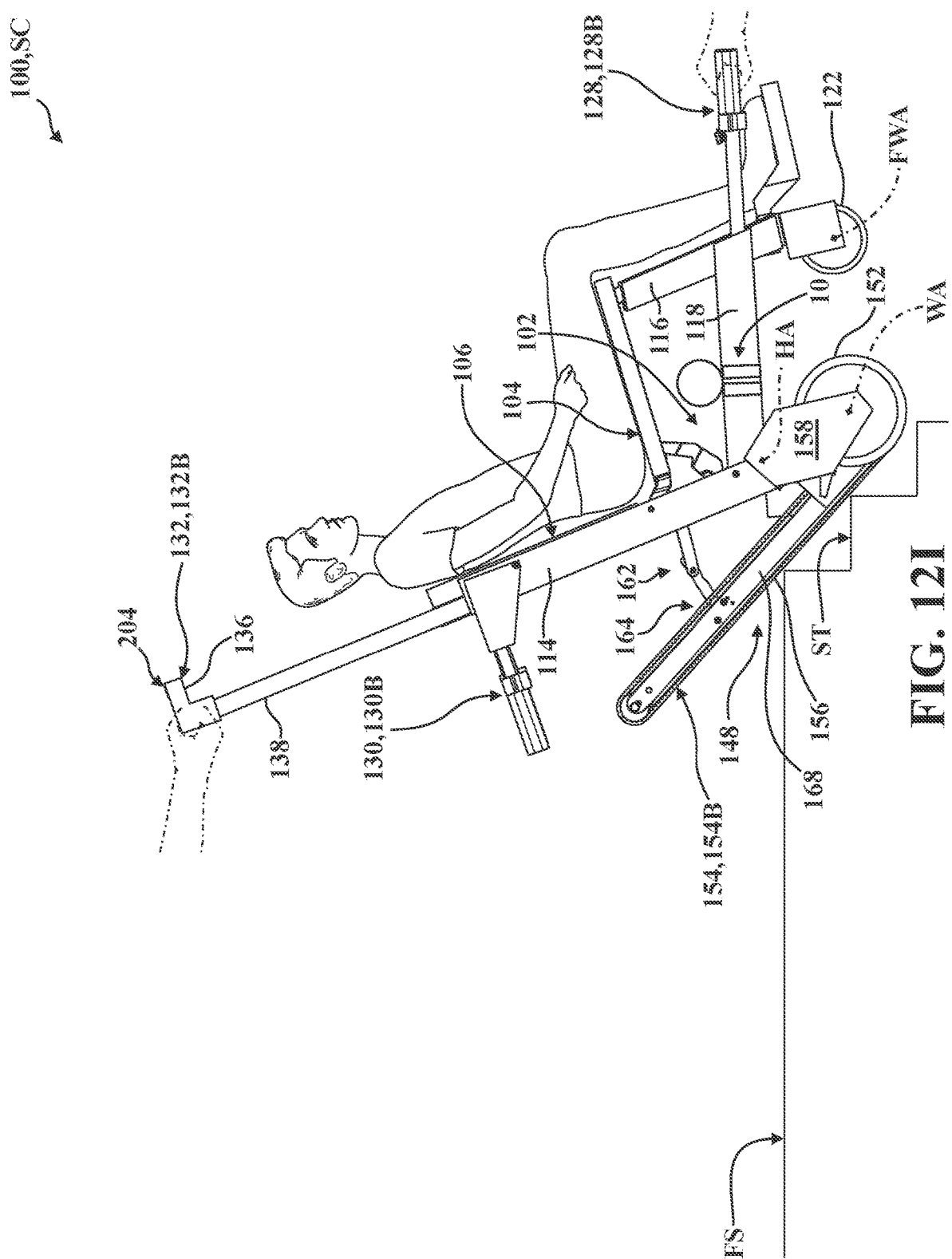
FIG. 12I is another right-side plan view of the patient transport system of FIG. 12C, shown with the belt of the track assembly in contact with the stairs while still supported by the first and second caregivers.

In the representative embodiment illustrated herein, the upper grip 136 generally comprises a first hand grip region 144 arranged adjacent to one of the extension posts 138, and a second hand grip region 146 arranged adjacent to the other of the extension posts 138, each of which may be engaged by the caregiver to support the patient transport apparatus 100 for movement, such as during patient transport up or down stairs ST (see FIGS. 12G-12I).

As noted above, the patient transport apparatus 100 is configured for use in transporting the patient across floor surfaces FS, such as when operating in the chair configuration CC, and for transporting the patient along stairs ST, such as when operating in the stair configuration SC. To these ends, the illustrated patient transport apparatus 100 includes a carrier assembly 148 arranged for movement relative to the support structure 102 between the chair configuration CC and the stair configuration ST. The carrier assembly 148 generally comprises at least one shaft 150 defining a wheel axis WA, one or more rear wheels 152 supported for rotation about the wheel axis WA, at least one track assembly 154 having a belt 156 for engaging stairs ST, and one or more hubs 158 supporting the shaft 150 and the track assembly 154 and the shaft 150 for concurrent pivoting movement about a hub axis HA. Here, movement of the carrier assembly 148 from the chair configuration CC (see FIGS. 1 and 6A) to the stair configuration SC (see FIGS. 2 and 6B) simultaneously deploys the track assembly 154 for engaging stairs ST with the belt 156 and moves the wheel axis WA longitudinally closer to the front support assembly 110 so as to position the rear wheels 152 further underneath the seat section 104 and closer to the front wheels 122.

As is described in greater detail below in connection with FIGS. 12A-12I, the movement of the rear wheels 152 relative to the front wheels 122 when transitioning from the chair configuration CC to the stair configuration SC that is afforded by the patient transport apparatus 100 of the present disclosure affords significant improvements in patient comfort and caregiver usability, in that the rear wheels 152 are arranged to promote stable transport across floor surfaces FS in the chair configuration CC but are arranged to promote easy transitioning from floor surfaces to stairs ST as the patient transport apparatus 100 is "tilted" backwards about the rear wheels 152 (compare FIGS. 12D-12H). Put differently, positioning the rear wheels 152 relative to the front wheels 122 consistent with the present disclosure makes "tilting" the patient transport apparatus 100 significantly less burdensome for the caregivers and, at the same time, much more comfortable for the patient due to the arrangement of the patient's center of gravity relative to the portion of the rear wheels 152 contacting the floor surface FS as the patient transport apparatus 100 is "tilted" backwards to transition into engagement with the stairs ST. As shown in the illustrated examples, the patient transport apparatus 100 may also be transitioned between the chair configuration CC and stair configuration CC without user adjustment of the holder 10 or an oxygen container received therein.

In the representative embodiments illustrated herein, the carrier assembly 148 comprises hubs 158 that are pivotably coupled to the respective rear uprights 114 for concurrent movement about the hub axis HA. Here, one or more bearings, bushings, shafts, fasteners, and the like (not shown in detail) may be provided to facilitate pivoting motion of the hubs 158 relative to the rear uprights 114. Similarly, bearings and/or bushings (not shown) may be provided to facilitate smooth rotation of the rear wheels 152 about the wheel axis WA. Here, the shafts 150 may be fixed to the hubs 158 such that the rear wheels 152 rotate about the shafts 150 (e.g., about bearings supported in the rear wheels 152), or the shafts 150 could be supported for rotation relative to the hubs 158. Each of the rear wheels 152 is also provided with a wheel lock 160 coupled to its respective hub 158 to facilitate inhibiting rotation about the wheel axis WA. The wheel locks 160 are generally pivotable relative to the hubs 158, and may be configured in a number of different ways without departing from the scope of the present disclosure. While the representative embodiment of the patient transport apparatus 100 illustrated herein employs hubs 158 with "mirrored" profiles that are coupled to the respective rear uprights 114 and support discrete shafts 150 and wheel locks 160, it will be appreciated that a single hub 158 and/or a single shaft 150 could be employed. Other configurations are contemplated.

Figure 6B:
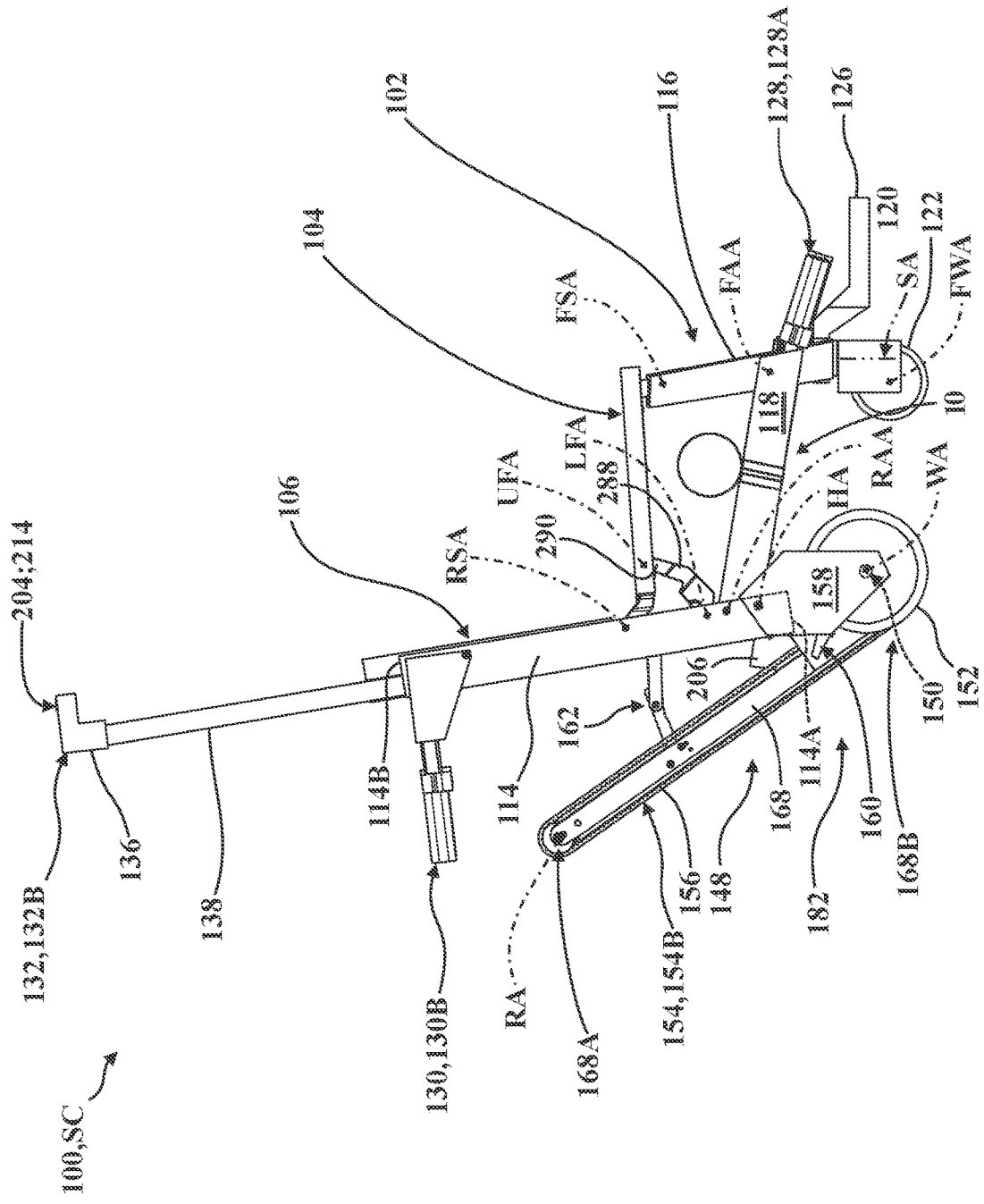
FIG. 6B is another right-side plan view of the patient transport system of FIGS. 5-6A, with the patient transport apparatus shown arranged in the stair configuration as depicted in FIGS. 2-3.

As is best depicted in FIGS. 6A-6B, the rear uprights 114 each generally extend between a lower upright end 114A and an upper upright end 114B, with the hub axis HA arranged adjacent to the lower upright end 114A. The lower upright end 114A is supported for movement within the hub 158, which may comprise a hollow profile or recess defined by multiple hub housing components (not shown in detail in FIGS. 6A-6B). The rear uprights 114 may each comprise a generally hollow, extruded profile which supports various components of the patient transport apparatus 100. In the illustrated embodiment, the hub axis HA is arranged generally vertically between the rear arm axis RAA and the wheel axis WA.

Figure 7A:
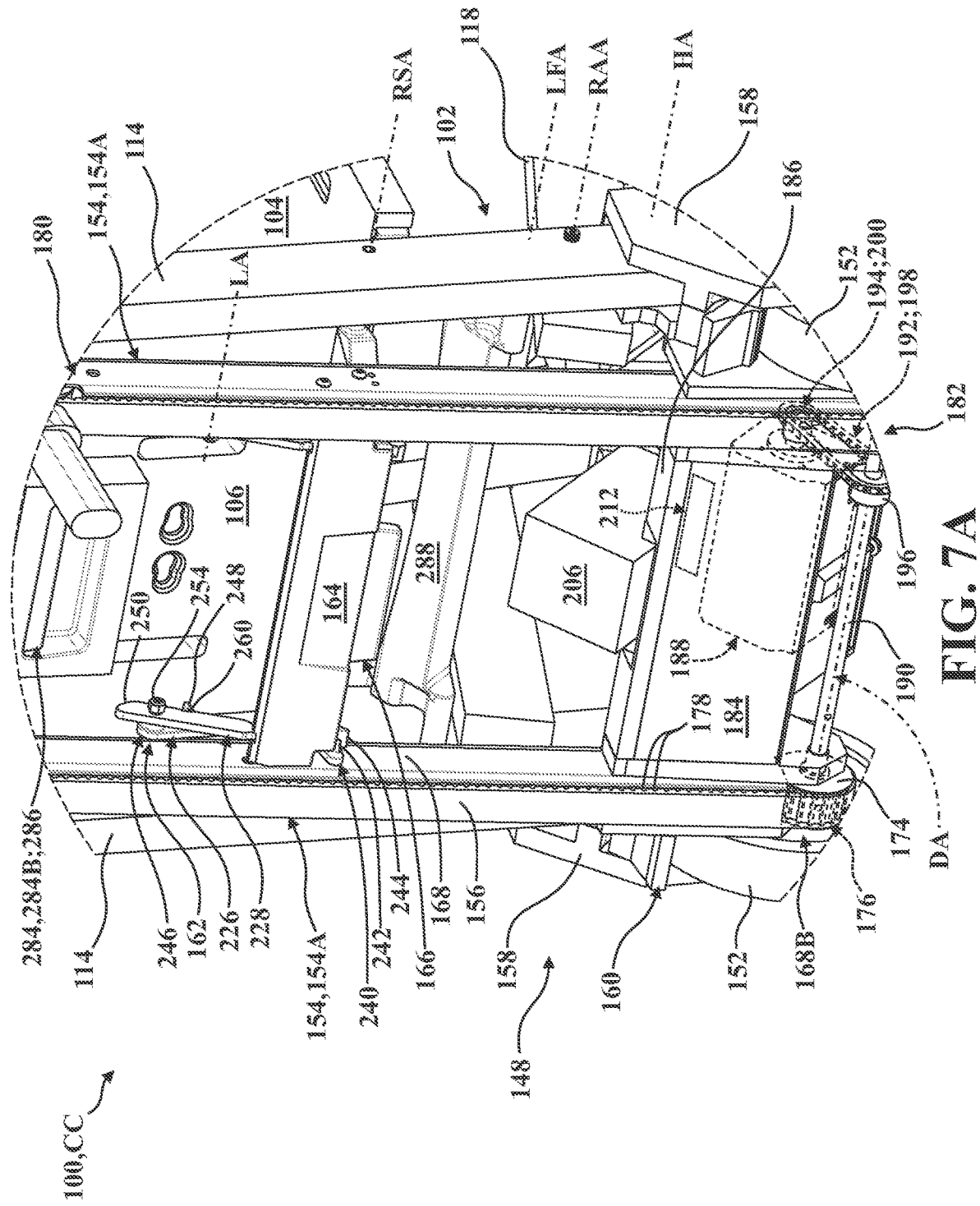
FIG. 7A is a partial rear perspective view of the patient transport system of FIGS. 1-6B, with the patient transport apparatus shown arranged in the chair configuration as depicted in FIGS. 1 and 6A, with the deployment lock mechanism shown retaining the track assembly in the retracted position.
Figure 7B:
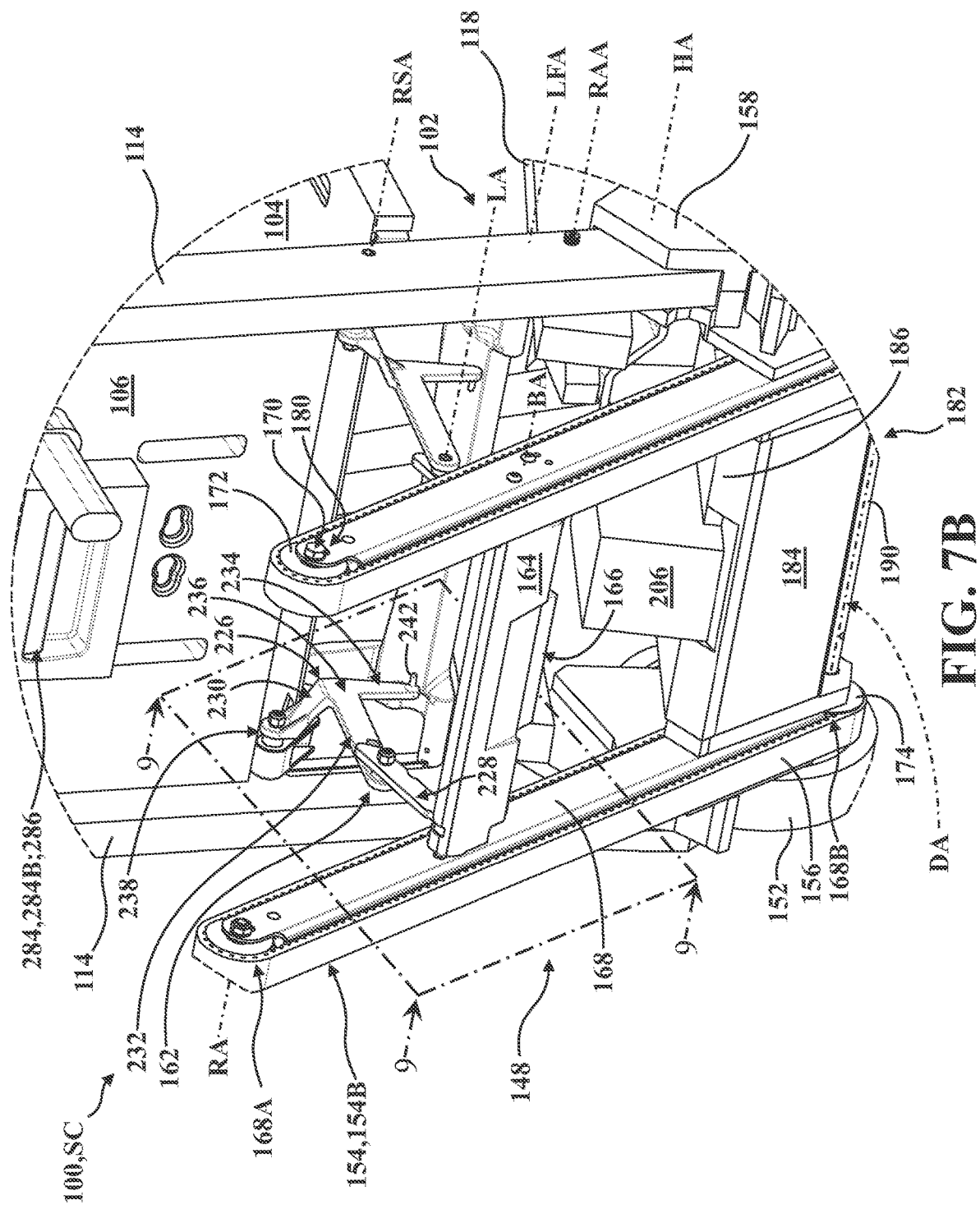
FIG. 7B is another partial rear perspective view of the patient transport system of FIG. 7A, with the patient transport apparatus shown arranged in the stair configuration as depicted in FIGS. 2-3 and 6B, with the deployment lock mechanism shown retaining the track assembly in the deployed position.

Referring now to FIGS. 7A-7B, as noted above, the track assemblies 154 move concurrently with the hubs 158 between the chair configuration CC and the stair configuration SC. Here, the track assemblies 154 are arranged in a retracted position 154A when the carrier assembly 148 is disposed in the chair configuration CC, and are disposed in a deployed position 154B when the carrier assembly 148 is disposed in the stair configuration SC. As is described in greater detail below, the illustrated patient transport apparatus 100 comprises a deployment linkage 162 and a deployment lock mechanism 164 with a deployment lock release 166 arranged for engagement by the caregiver to facilitate changing between the retracted position 154A and the deployed position 154B (and, thus, between the chair configuration CC and the stair configuration SC).

In the illustrated embodiment, the patient transport apparatus 100 comprises laterally-spaced track assemblies 154 each having a single belt 156 arranged to contact stairs ST. However, it will be appreciated that other configurations are contemplated, and a single track assembly 154 and/or track assemblies with multiple belts 156 could be employed. The track assemblies 154 each generally comprise a rail 168 extending between a first rail end 168A and a second rail end 168B. The second rail end 168B is operatively attached to the hub 158, such as with one or more fasteners (not shown in detail). An axle 170 defining a roller axis RA is disposed adjacent to the first rail end 168A of each rail 168, and a roller 172 is supported for rotation about the roller axis RA (compare FIGS. 9A-9B). For each of the track assemblies 154, the belt 156 is disposed in engagement with the roller 172 and is arranged for movement relative to the rail 168 in response to rotation of the roller 172 about the roller axis RA. Adjacent to the second rail end 168B of each rail 168, a drive pulley 174 is supported for rotation about a drive axis DA and is likewise disposed in engagement with the belt 156 (see FIGS. 7A-7B; rotation about drive axis DA not shown in detail). Here, the drive pulley 174 comprises outer teeth 176 which are disposed in engagement with inner teeth 178 formed on the belt 156. The track assemblies 154 each also comprise a belt tensioner, generally indicated at 180, configured to adjust tension in the belt 156 between the roller 172 and the drive pulley 174.

In the representative embodiment illustrated herein, the patient transport apparatus 100 comprises a drive system, generally indicated at 182, configured to facilitate driving the belts 156 of the track assemblies 154 relative to the rails 168 to facilitate movement of the patient transport apparatus 100 up and down stairs ST. To this end, and as is depicted in FIG. 7A, the drive system 182 comprises a drive frame 184 and a cover 186 which are operatively attached to the hubs 158 of the carrier assembly 148 for concurrent movement with the track assemblies 154 between the retracted position 154A and the deployed position 154B. A motor 188 (depicted in phantom in FIG. 7A) is coupled to the drive frame 184 and is concealed by the cover 186. The motor 188 is configured to selectively generate rotational torque used to drive the belts 156 via the drive pulleys 174, as described in greater detail below. To this end, a drive axle 190 is coupled to each of the drive pulleys 174 and extends along the drive axis DA laterally between the track assemblies 154. The drive axle 190 is rotatably supported by the drive frame 184, such as by one or more bearings, bushings, and the like (not shown in detail). A geartrain 192 is disposed in rotational communication between the motor 188 and the drive axle 190. To this end, in the embodiment depicted in FIG. 7A, the geartrain 192 comprises a first sprocket 194, a second sprocket 196, and an endless chain 198. Here, the motor 188 comprises an output shaft 200 to which the first sprocket 194 is coupled, and the second sprocket 196 is coupled to the drive axle 190. The endless chain 198, in turn, is supported about the first sprocket 194 and the second sprocket 196 such that the drive axle 190 and the output shaft 200 rotate concurrently. The geartrain 192 may be configured so as to adjust the rotational speed and/or torque of the drive axle 190 relative to the output shaft 200 of the motor, such as by employing differently-configured first and second sprockets 194, 196 (e.g., different diameters, different numbers of teeth, and the like).

While the representative embodiment of the drive system 182 illustrated herein utilizes a single motor 188 to drive the belts 156 of the track assemblies 154 concurrently using a chain-based geartrain 192, it will be appreciated that other configurations are contemplated. By way of non-limiting example, multiple motors 188 could be employed, such as to facilitate driving the belts 156 of the track assemblies 154 independently. Furthermore, different types of geartrains 192 are contemplated by the present disclosure, including without limitation geartrains 192 which comprise various arrangements of gears, planetary gearsets, and the like.

Figure 4:
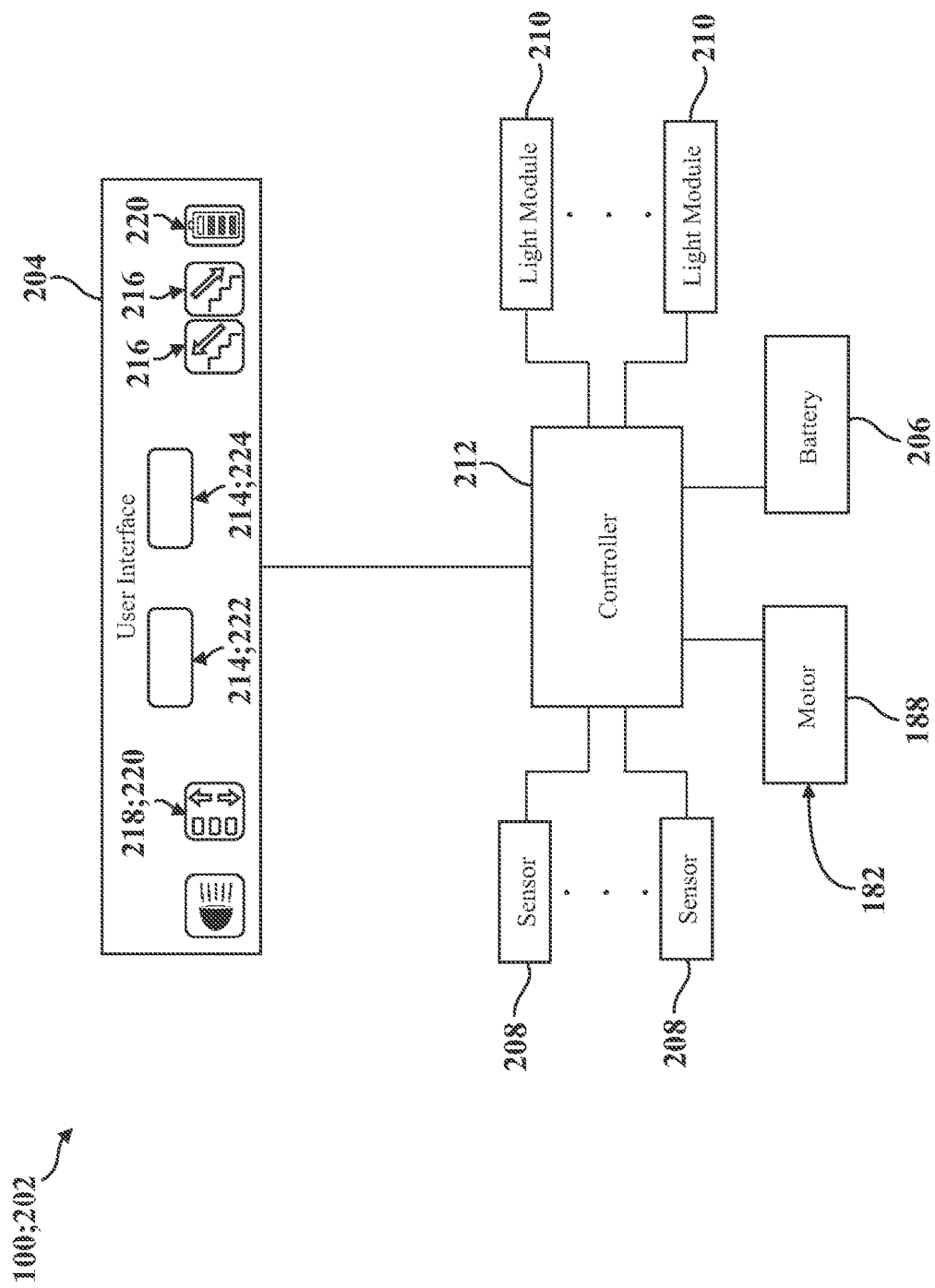
FIG. 4 is a partial schematic view of a control system of the patient transport apparatus of FIGS. 1-3, shown with a controller disposed in communication with a battery, a user interface, a drive system, and a plurality of light modules.

The patient transport apparatus 100 comprises a control system 202 to, among other things, facilitate control of the track assemblies 154. To this end, and as is depicted schematically in FIG. 4, the representative embodiment of the control system 202 generally comprises a user interface 204, a battery 206, one or more sensors 208, and one or more light modules 210 which are disposed in electrical communication with a controller 212. As will be appreciated from the subsequent description below, the controller 212 may be of a number of different types, styles, and/or configurations, and may employ one or more microprocessors for processing instructions or an algorithm stored in memory to control operation of the motor 188, the light modules 210, and the like. Additionally or alternatively, the controller 212 may comprise one or more sub-controllers, microcontrollers, field programmable gate arrays, systems on a chip, discrete circuitry, and/or other suitable hardware, software, and/or firmware that is capable of carrying out the functions described herein. The controller 212 is coupled to various electrical components of the patient transport apparatus 100 (e.g., the motor 188) in a manner that allows the controller 212 to control or otherwise interact with those electrical components the (e.g., via wired and/or wireless electrical communication). In some embodiments, the controller 212 may generate and transmit control signals to the one or more powered devices, or components thereof, to drive or otherwise facilitate operating those powered devices, or to cause the one or more powered devices to perform one or more of their respective functions.

The controller 212 may utilize various types of sensors 208 of the control system 202, including without limitation force sensors (e.g., load cells), timers, switches, optical sensors, electromagnetic sensors, motion sensors, accelerometers, potentiometers, infrared sensors, ultrasonic sensors, mechanical limit switches, membrane switches, encoders, and/or cameras. One or more sensors 208 may be used to detect mechanical, electrical, and/or electromagnetic coupling between components of the patient transport apparatus 100. Other types of sensors 208 are also contemplated. Some of the sensors 208 may monitor thresholds movement relative to discrete reference points. The sensors 208 can be located anywhere on the patient transport apparatus 100, or remote from the patient transport apparatus 100. Other configurations are contemplated.

It will be appreciated that the patient transport apparatus 100 may employ light modules 210 to, among other things, illuminate the user interface 204, direct light toward the floor surface FS, and the like. It will be appreciated that the light modules 210 can be of a number of different types, styles, configurations, and the like (e.g., light emitting diodes LEDs) without departing from the scope of the present disclosure. Similarly, it will be appreciated that the user interface 204 may employ user input controls of a number of different types, styles, configurations, and the like (e.g., capacitive touch sensors, switches, buttons, and the like) without departing from the scope of the present disclosure.

The battery 206 provides power to the controller 212, the motor 188, the light modules 210, and other components of the patient transport apparatus 100 during use, and is removably attachable to the cover 186 of the drive system 182 in the illustrated embodiment (see FIG. 7A; attachment not shown in detail). The user interface 204 is generally configured to facilitate controlling the drive direction and drive speed of the motor 188 to move the belts 156 of the track assembly 154 and, thus, allow the patient transport apparatus 100 to ascend or descend stairs ST. Here, the user interface 204 may comprise one or more activation input controls 214 to facilitate driving the motor 188 in response to engagement by the caregiver, one or more direction input controls 216 to facilitate changing the drive direction of the motor 188 in response to engagement by the caregiver, and/or one or more speed input controls 218 to facilitate operating the motor 188 at different predetermined speeds selectable by the caregiver. The user interface 204 may also comprise various types of indicators 220 to display information to the caregiver. It will be appreciated that the various components of the control system 202 introduced above could be configured and/or arranged in a number of different ways, and could communicate with each other via one or more types of electrical communication facilitated by wired and/or wireless connections. Other configurations are contemplated.

The activation input controls 214 may be arranged in various locations about the patient transport apparatus. In the illustrated embodiments, a first activation input control 222 is disposed adjacent to the first hand grip region 144 of the handle assembly 132, and a second activation input control 224 is disposed adjacent to the second hand grip region 146. In the illustrated embodiment, the user interface 204 is configured such that the caregiver can engage either of the activation input controls 222, 224 with a single hand grasping the upper grip 136 of the handle assembly 132 during use.

In the illustrated embodiments, the patient transport apparatus 100 is configured to limit movement of the belts 156 relative to the rails 168 during transport along stairs ST in an absence of engagement with the activation input controls 214 by the caregiver. Put differently, one or more of the controller 212, the motor 188, the geartrain 192, and/or the track assemblies 154 may be configured to "brake" or otherwise prevent movement of the belts 156 unless the activation input controls 214 are engaged. To this end, the motor 188 may be controlled via the controller 212 to prevent rotation (e.g., driving with a 0% pulse-width modulation PWM signal) in some embodiments. However, other configurations are contemplated, and the patient transport apparatus 100 could be configured to prevent movement of the belts 156 in other ways. By way of non-limiting example, a mechanical brake system (not shown) could be employed in some embodiments.

Referring now to FIGS. 7A-9B, the patient transport apparatus 100 employs the deployment lock mechanism 164 to releasably secure the track assembly 154 in the retracted position 154A and in the deployed position 154B. As is described in greater detail below, the deployment lock release 166 is arranged for engagement by the caregiver to move between the retracted position 154A and the deployed position 154B. The deployment lock mechanism 164 is coupled to the track assemblies 154 for concurrent movement, and the deployment linkage 162 is coupled between the deployment lock mechanism 164 and the support structure 102. The illustrated deployment linkage 162 generally comprises connecting links 226 which are pivotably coupled to the support structure 102, and brace links 228 which are coupled to the deployment lock mechanism 164 and are respectively pivotably coupled to the connecting links 226.

Figure 9A:
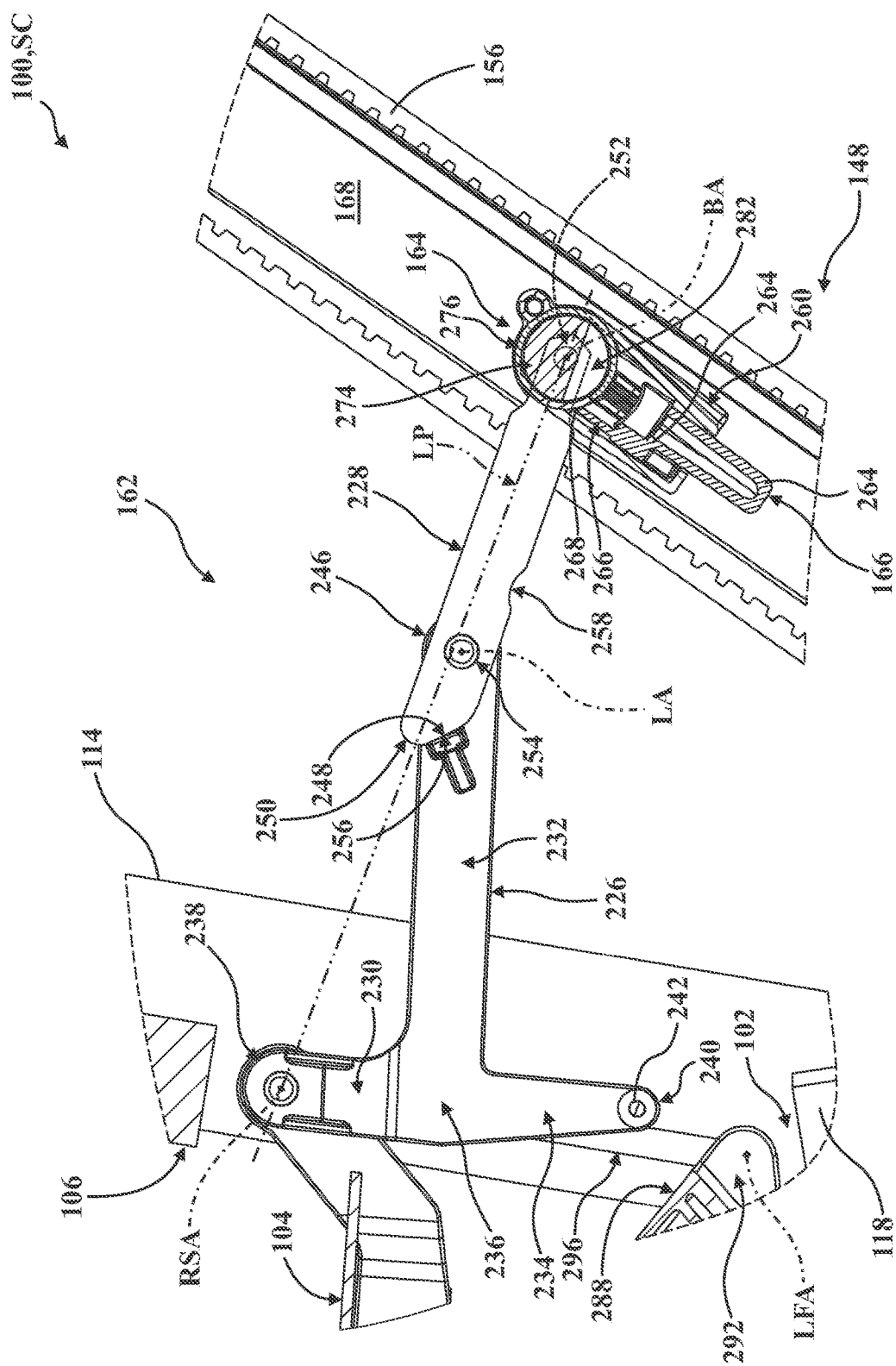
FIG. 9A is a partial section view generally taken through plane 9 of FIGS. 7B—8, shown with the deployment lock mechanism retaining the track assembly in the deployed position.

As is best shown in FIG. 9A, the connecting links 226 each comprise or otherwise define a forward pivot region 230, a connecting pivot region 232, a trunnion region 234, and an interface region 236. The forward pivot regions 230 extend from the interface regions 236 to forward pivot mounts 238 which are pivotably coupled to the rear uprights 114 about the rear seat axis RSA, such as by one or more fasteners, bushings, bearings, and the like (not shown in detail). Here, because the rear uprights 114 are spaced laterally away from each other at a distance large enough to allow the track assemblies 154 to "nest" therebetween in the retracted position 154A (see FIG. 7A), the forward pivot regions 230 of the connecting links 226 extend at an angle away from the rear uprights 114 at least partially laterally towards the track assemblies 154. The trunnion regions 234 extend generally vertically downwardly from the interface regions 236 to trunnion mount ends 240, and comprise trunnions 242 which extend generally laterally and are arranged to abut trunnion catches 244 of the deployment lock mechanism 164 to retain the track assemblies 154 in the retracted position 154A (see FIG. 7A) as described in greater detail below. The connecting pivot regions 232 extend longitudinally away from the interface regions 236 to rearward pivot mounts 246 which pivotably couple to the brace links 228 about a link axis LA. The connecting pivot regions 232 also comprise link stops 248 that are shaped and arranged to abut the brace links 228 in the deployed position 154B (see FIG. 7B), as described in greater detail below. The connecting links 226 are each formed as separate components with mirrored profiles in the illustrated embodiments, but could be realized in other ways, with any suitable number of components.

The brace links 228 each generally extend between an abutment link end 250 and a rearward link mount 252, with a forward link mount 254 arranged therebetween. The forward link mounts 254 are pivotably coupled to the rearward pivot mounts 246 of the connecting links 226 about the link axis LA, such as by one or more fasteners, bushings, bearings, and the like (not shown in detail). The rearward link mounts 252 are each operatively attached to the deployment lock mechanism 164 about a barrel axis BA, as described in greater detail below. The brace links 228 each define a link abutment surface 256 disposed adjacent to the abutment link end 250 which are arranged to abut the link stops 248 of the connecting links 226 in the deployed position 154B (see FIGS. 7B and 9B). The brace links 228 also define a relief region 258 formed between the forward link mount 254 and the rearward link mount 252. The relief regions 258 are shaped to at least partially accommodate the link stops 248 of the connecting links 226 when the track assemblies 154 are in the retracted position 154A (not shown in detail).

Figure 8:
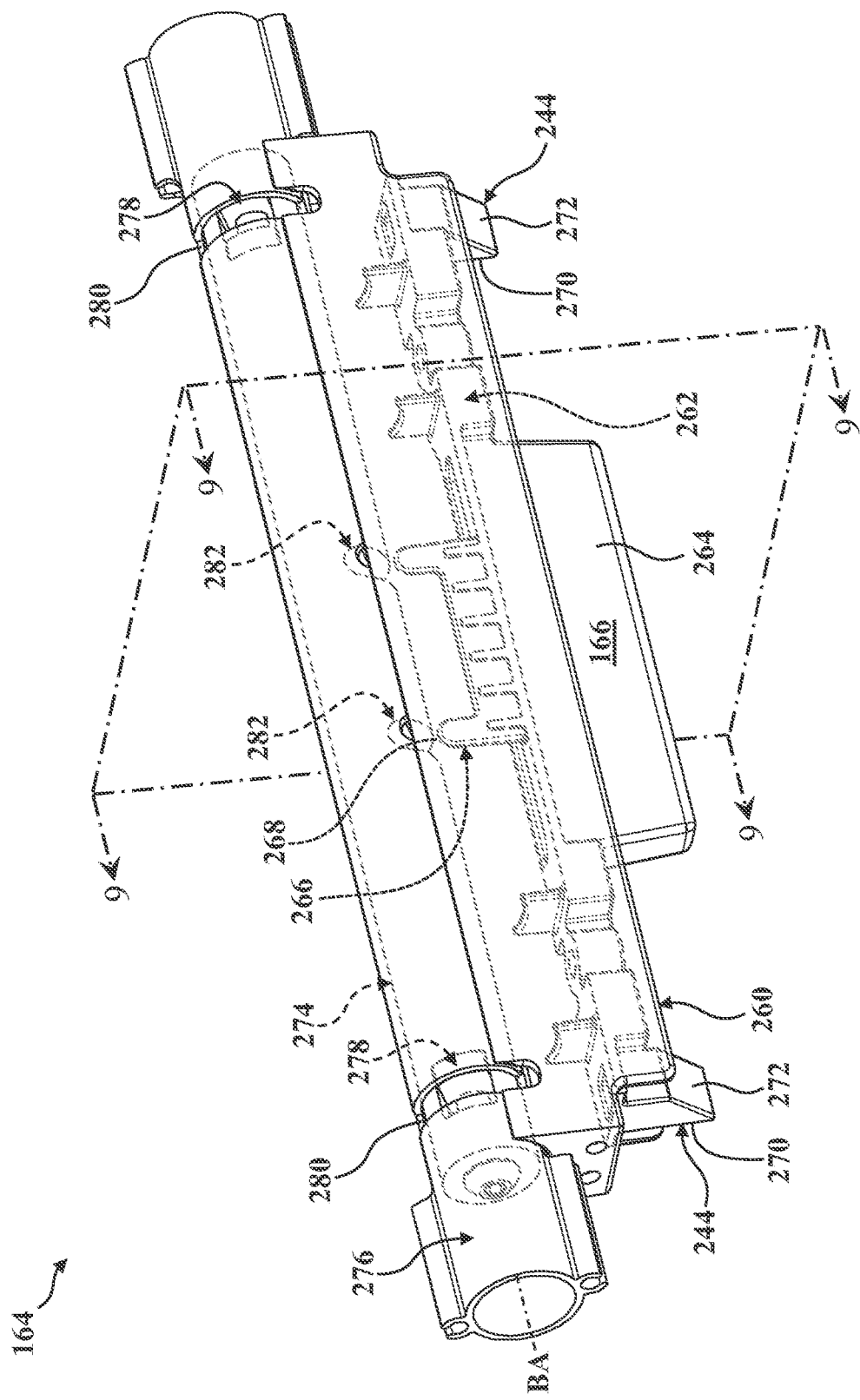
FIG. 8 is a perspective view of portions of the deployment lock mechanism of FIGS. 7A-7B, shown having a deployment lock release.

Referring now to FIG. 8, the deployment lock release 166 of the deployment lock mechanism 164 is supported for movement within a lock housing 260 which, in turn, is coupled to and extends laterally between the rails 168 of the track assemblies 154 (e.g., secured via fasteners; not shown). The deployment lock release 166 is formed as a unitary component in the illustrated embodiment, and generally comprises a deployment body 262, a deployment button 264, one or more push tabs 266, and the trunnion catches 244. The deployment button 264 is arranged for engagement by the caregiver, extends vertically downwardly from the deployment body 262, and is disposed laterally between the trunnion catches 244. The one or more push tabs 266 extend vertically upwardly from the deployment body 262 to respective push tab ends 268, and are employed to facilitate releasing the track assemblies 154 from the deployed position 154B as described in greater detail below. The trunnion catches 244 each define a retention face 270 arranged to abut the trunnions 242 of the connecting links 226 when the track assemblies 154 are in the retracted position 154A (see FIG. 7A). The trunnion catches 244 also each define a trunnion cam face 272 arranged to engage against the trunnions 242 of the connecting links 226 as the track assemblies 154 are brought toward the deployed position 154B from the retracted position 154A. While not shown in detail throughout the drawings, engagement of the trunnions 242 against the trunnion cam faces 272 urges the deployment body 262 vertically upwardly within the lock housing 260 until the trunnions 242 come out of engagement with the trunnion cam faces 272. Here, one or more biasing elements (not shown) may bias the deployment lock release 166 vertically downwardly within the lock housing 260 such that disengagement of the trunnions 242 with trunnion cam faces 272 occurs as the track assemblies 154 reach the deployed position 154B and the trunnions 242 come into engagement with the retention faces 270 (see FIG. 7B).

With continued reference to FIG. 8, the deployment lock mechanism 164 also comprises a barrel 274 supported for rotation about the barrel axis BA (compare FIGS. 9A-9B) within a cylinder housing 276 which, in turn, is coupled to and extends laterally between the rails 168 of the track assemblies 154 (e.g., secured via fasteners; not shown). The barrel 274 defines barrel notches 278 which receive the rearward link mounts 252 of the brace links 228 therein. Here, the cylinder housing 276 comprises transverse apertures 280 aligned laterally with the barrel notches 278 and shaped to receive the brace links 228 therethrough to permit the brace links 228 to move generally concurrently with the barrel 274 relative to the cylinder housing 276. Here, the barrel notches 278 and the rearward link mounts 252 are provided with complimentary profiles that allow the brace links 228 to pivot about the barrel axis BA as the barrel 274 rotates within the cylinder housing 276. The barrel notches 278 may be sized slightly larger than the rearward link mounts 252 to prevent binding. However, it will be appreciated that other configurations are contemplated. The barrel 274 also comprises push notches 282 arranged laterally between the barrel notches 278. The push notches 282 are shaped to receive the push tab ends 268 of the push tabs 266 to facilitate releasing the track assemblies 154 from the deployed position 154B in response to the caregiver engaging the deployment button 264. As depicted in FIG. 9A, retention of the track assemblies 154 in the deployed position 154B is achieved based on the geometry of the deployment linkage 162 acting as an "over center" lock.

Figure 9B:
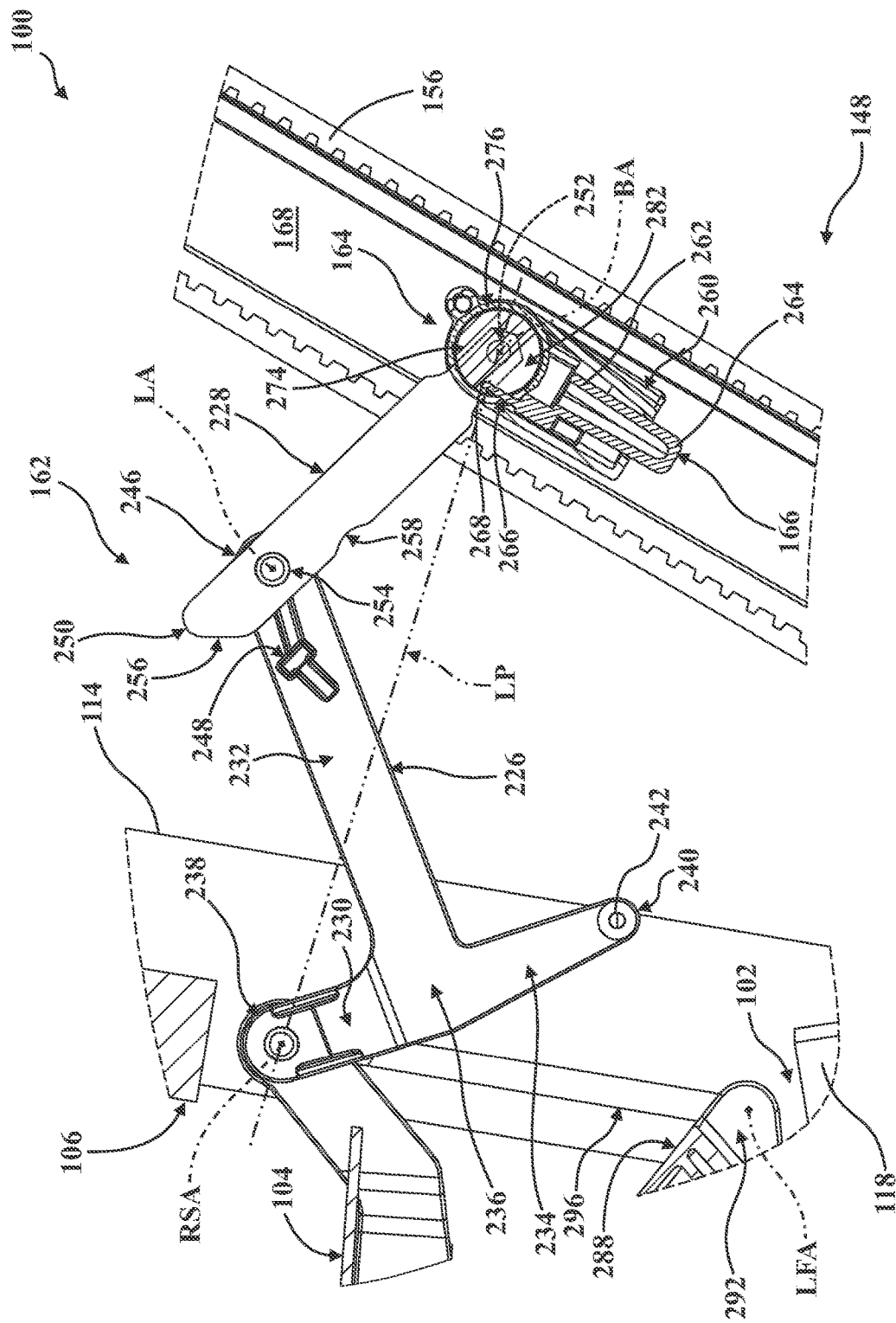
FIG. 9B is another partial section view of the portions of the patient transport apparatus depicted in FIG. 9A, shown with the track assembly having moved from the deployed position in response to engagement of the deployment lock release of the deployment lock mechanism.

More specifically, when the track assemblies 154 move to the deployed position 154B, the link axis LA is arranged below a linkage plane LP defined extending through the rear seat axis RSA and the barrel axis BA, and will remain in the deployed position 154B until the link axis LA is moved above the linkage plane LP (see FIG. 9B). To this end, the caregiver can engage the deployment button 264 to bring the push tab ends 268 of the push tabs 266 into engagement with the push notches 282 formed in the barrel 274 which, in turn, rotates the barrel 274 about the barrel axis BA and pivots the brace links 228 about the barrel axis BA to cause the link axis LA to move above the linkage plane LP as shown in FIG. 9B. It will be appreciated that the deployment lock mechanism 164 could be configured in other ways sufficient to releasably lock the track assemblies 154 in the retracted position 154A and the deployed position 154B, and it is contemplated that one lock mechanism could lock the track assemblies 154 in the retracted position 154A while a different lock mechanism could lock the track assemblies 154 in the deployed position 154B. Other configurations are contemplated.

Figure 10:
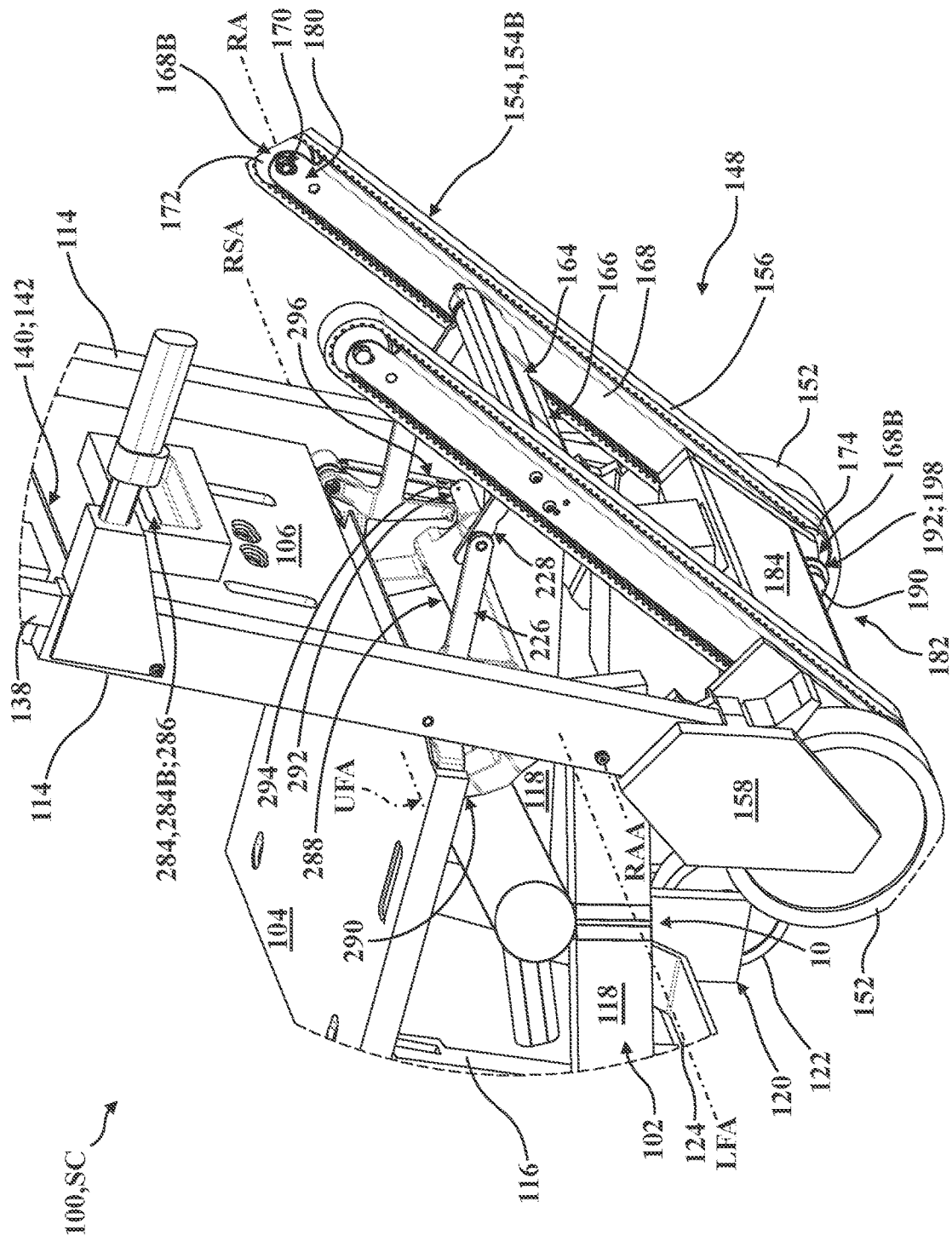
FIG. 10 is a partial rear perspective view of the patient transport system of FIGS. 1-9B, showing additional detail of the folding lock mechanism of the patient transport apparatus.
Figure 11A:
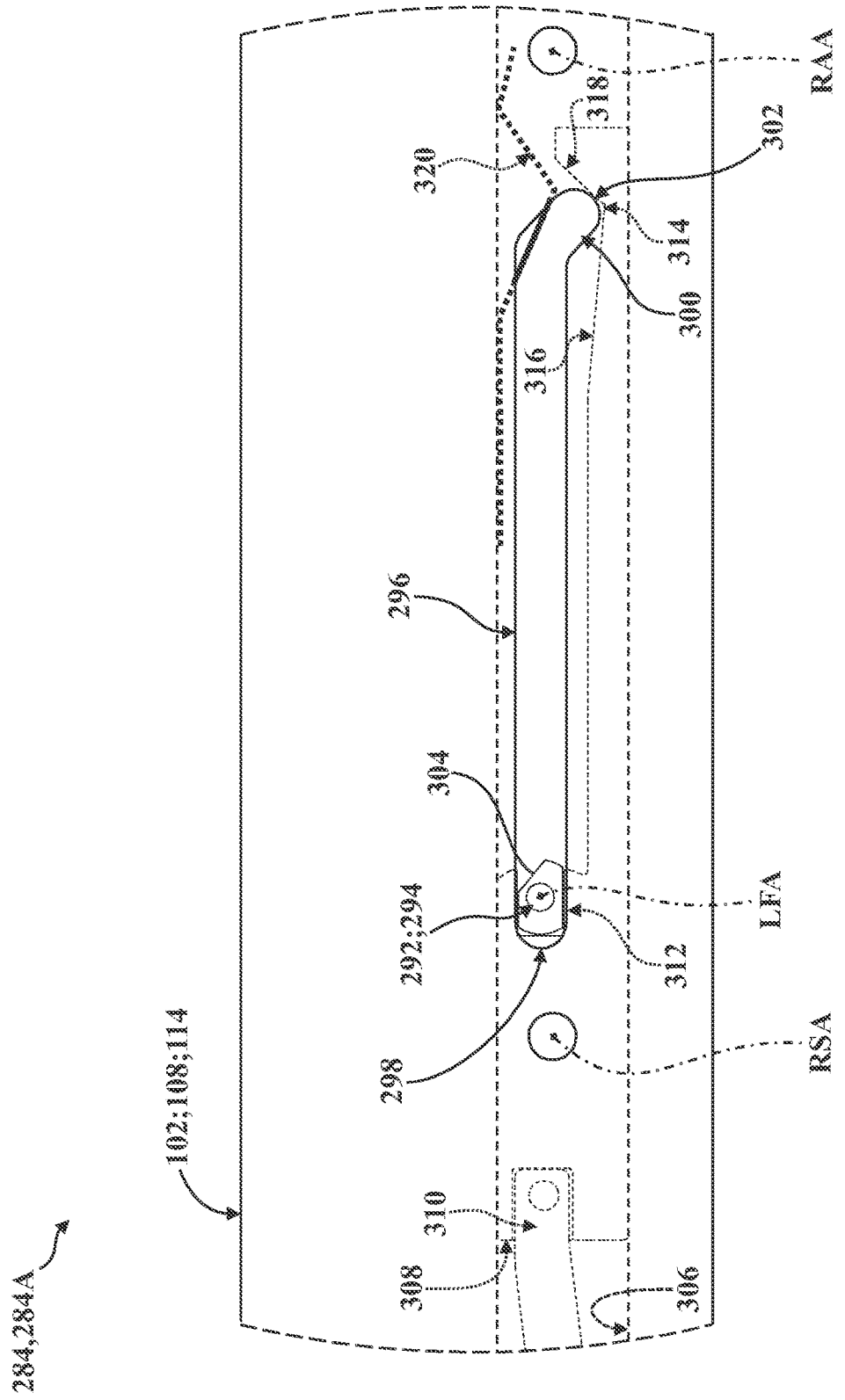
FIG. 11A is a partial schematic view of portions of the folding lock mechanism of the patient transport apparatus of FIGS. 1-10, shown arranged in a stow lock configuration corresponding to the stowed configuration as depicted in FIG. 5.
Figure 11B:
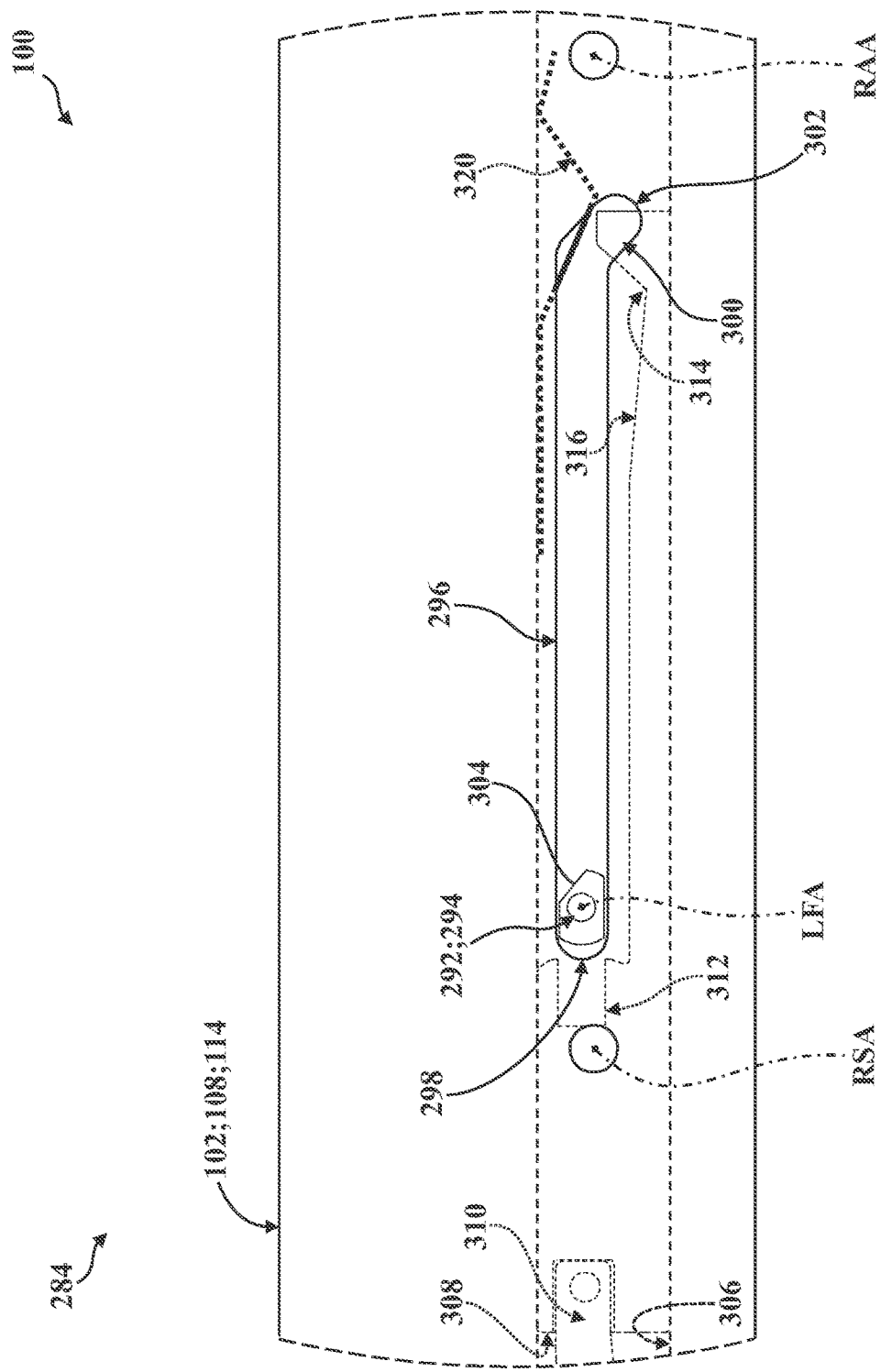
FIG. 11B is another partial schematic view of the portions of the folding lock mechanism of FIG. 11A, shown having moved out of the stow lock configuration to enable operation in the chair configuration as depicted in FIG. 6A.
Figure 11C:
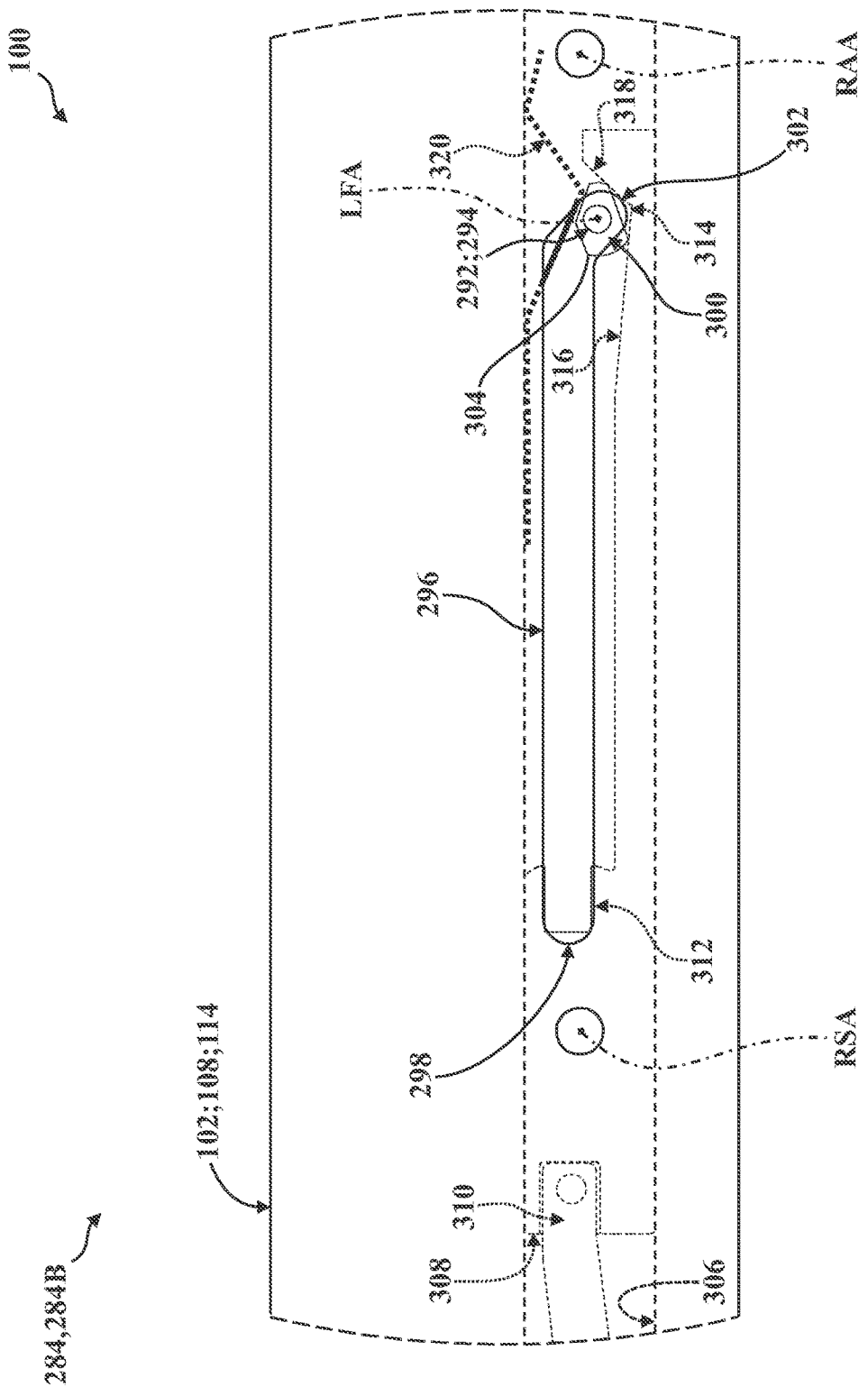
FIG. 11C is another partial schematic view of the portions of the folding lock mechanism of FIGS. 11A-11B, shown arranged in a use lock configuration corresponding to the chair configuration as depicted in FIG. 6A.
Figure 11D:
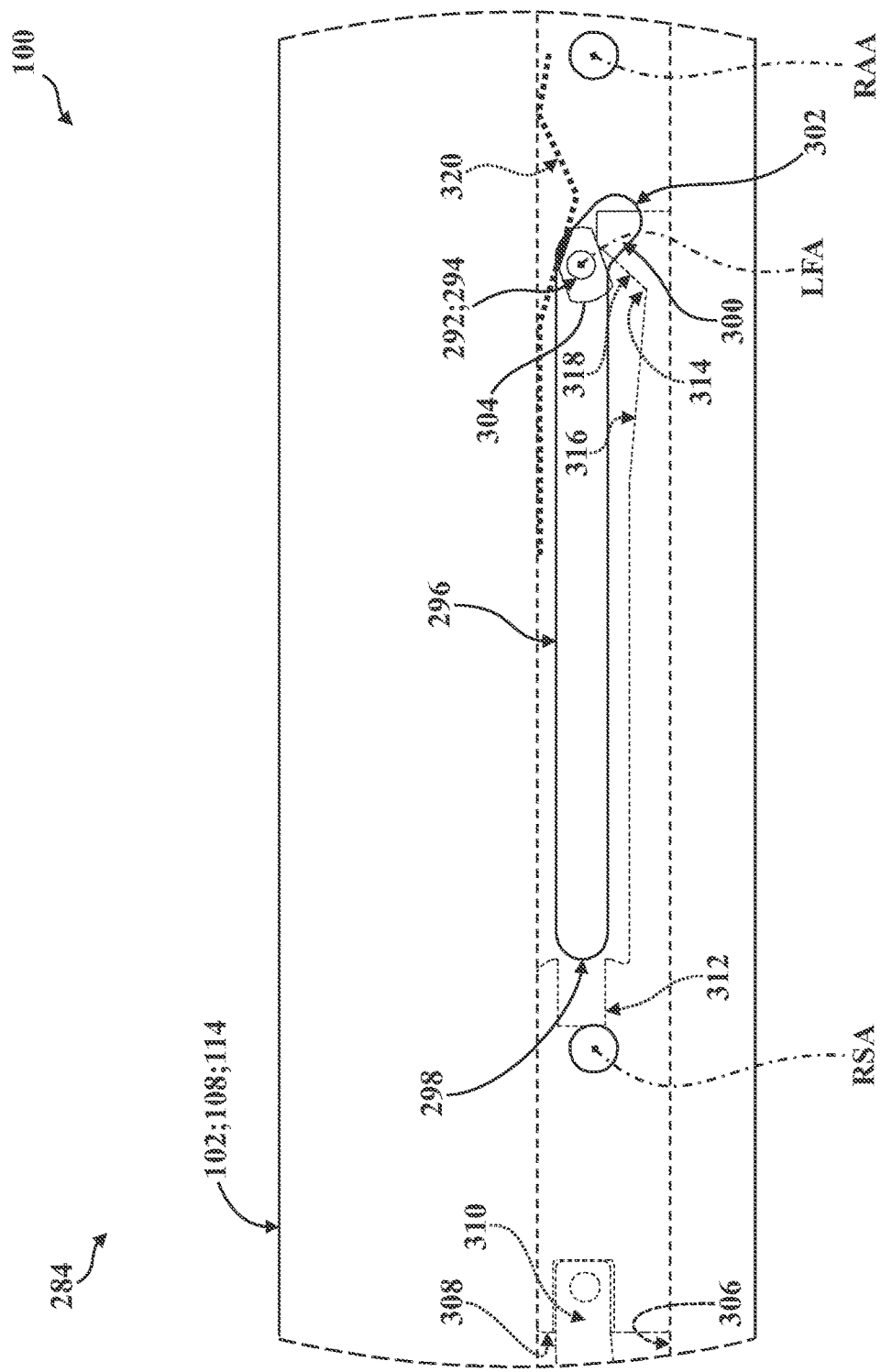
FIG. 11D is another partial schematic view of the portions of the folding lock mechanism of FIGS. 11A-11C, shown having moved out of the use lock configuration to enable operation in the stowed configuration as depicted in FIG. 5.

Referring now to FIGS. 10-11D, the patient transport apparatus 100 employs a folding lock mechanism 284 to facilitate changing between the stowed configuration WC (see FIG. 5) and the chair configuration CC (see FIG. 6A). To this end, the folding lock mechanism 284 generally comprises a folding lock release 286 (see FIG. 10) operatively attached to the back section 106 and arranged for engagement by the caregiver to releasably secure the folding lock mechanism 284 between a stow lock configuration 284A to maintain the stowed configuration WC, and a use lock configuration 284B to prevent movement to the stowed configuration WC from the chair configuration CC or from the stair configuration SC. To this end, the folding lock mechanism 284 generally comprises a folding link 288 with folding pivot mounts 290 and sliding pivot mounts 292. The folding pivot mounts 290 are pivotably coupled to the seat section 104 about an upper folding axis UFA that is arranged between the rear seat axis RSA and the front seat axis FSA (see FIGS. 2 and 6A-6B; pivoting not shown in detail). The sliding pivot mounts 292 each comprise a keeper shaft 294 which extends along a lower folding axis LFA which is arranged substantially parallel to the upper folding axis UFA. The keeper shafts 294 are disposed within and slide along slots 296 formed in each of the rear uprights 114. For the illustrative purposes, the keeper shafts 294 are shown in FIGS. 11A-11D as sized significantly smaller than the width of the slots 296. The slots 296 extend generally vertically along the rear uprights 114 between an upper slot end 298 and a transition slot region 300, and extend at an angle from the transition slot region 300 to a lower slot end 302. The slots 296 are disposed vertically between the rear seat axis RSA and the rear arm axis RAA in the illustrated embodiment. In some embodiments, the folding link 288, the slots 296, and or other portions of the folding lock mechanism 284 may be similar to as is disclosed in U.S. Pat. No. 6,648,343, previously referenced. Other configurations are contemplated.

In the representative embodiment illustrated herein, the folding lock mechanism 284 is configured to selectively retain the keeper shafts 294 adjacent to the upper slot ends 298 of the slots 296 in the stow lock configuration 284A (see FIG. 11A), and to selectively retain the keeper shafts 294 adjacent to the lower slot ends 302 of the slots 296 in the use lock configuration 284B (see FIG. 11C). To this end, keeper elements 304 are coupled to the keeper shafts 294 and move within upright channels 306 formed in the rear uprights 114. Here too, a carriage 308 is slidably supported within the upright channels 306 for movement relative to the slots 296 in response to engagement of the folding lock release 286 via the caregiver. A folding linkage assembly 310 generally extends in force-translating relationship between the folding lock release 286 and the carriage 308. While not shown in detail, the folding lock release 286 is supported by the back section 106 and moves in response to engagement by the caregiver, and the folding linkage assembly 310 comprises one or more components which may extend through the back section 106 and into the rear uprights 114 in order to facilitate movement of the carriage 308 within the upright channels 306 in response to user engagement of the folding lock release 286.

The carriage 308 generally defines an upper pocket 312 shaped to receive and accommodate the keeper element 304 when the folding lock mechanism 284 is in the stow lock configuration 284A with the patient transport apparatus 100 arranged in the stowed configuration WC, and a lower pocket 314 shaped to receive and accommodate the keeper element 304 when the folding lock mechanism 284 is in the use lock configuration 284B with the patient transport apparatus 100 arranged in the chair configuration CC or in the stair configuration SC. In the illustrated embodiment, the upper pocket 312 has a generally U-shaped profile and the lower pocket 314 has a generally V-shape profile which defines a upper ramp 316 and a lower ramp 318, As shown in FIG. 11A, engagement between the keeper element 304 and the upper pocket 312 of the carriage 308 prevents movement of the keeper shaft 294 along the slot 296. When the caregiver engages the folding lock release 286 to move the folding lock mechanism 284 out of the stow lock configuration 284A, the corresponding movement of the folding linkage assembly 310 causes the carriage 308 to travel vertically upwardly within the upright channel 306 until the keeper element 304 comes out of engagement with the upper pocket 312, as shown in FIG. 11B. Here, the keeper shaft 294 can subsequently traverse the slot 296 toward the lower slot end 302 in order to move to the use lock configuration 284B depicted in FIG. 11C. While not shown, it will be appreciated that the carriage 308, the folding linkage assembly 310, and or the folding lock release 286 may comprise one or more biasing elements arranged to urge the carriage 308 vertically down the upright channel 306.

When in the use lock configuration 284B depicted in FIG. 11C, the keeper shaft 294 is disposed adjacent to the lower slot end 302 of the slot 296 such that the keeper element 304 is generally disposed adjacent to or otherwise in the lower pocket 314, such as in contact with the upper ramp 316 and the lower ramp 318. Here, the keeper element 304 is retained via a folding lock biasing element 320 (depicted schematically) that is coupled to the rear upright 114 (e.g., disposed within the upright channel 306). The engagement between the keeper element 304 and folding lock biasing element 320 urges the keeper shaft 294 toward the lower slot end 302 of the slot 296 to maintain operation in the use lock configuration 284B depicted in FIG. 11C. When the caregiver engages the folding lock release 286 to move the folding lock mechanism 284 out of the use lock configuration 284B, the corresponding movement of the folding linkage assembly 310 causes the carriage 308 to travel vertically upwardly within the upright channel 306. Here, as the lower ramp 318 of the carriage 308 defined by the lower pocket 314 moves together with the keeper element 304 disposed in engagement therewith, the folding lock biasing element 320 compresses as the keeper shaft 294 travels out of the transition slot region 300, as shown in FIG. 11D. Here, the keeper shaft 294 can subsequently traverse the slot 296 toward the upper slot end 298 in order to move to the stow lock configuration 284A depicted in FIG. 11A. It will be appreciated that the folding lock mechanism 284 could be configured in other ways sufficient to releasably lock the patient transport apparatus in the stowed configuration WC, the stair configuration SC, and the chair configuration CC, and it is contemplated that one lock mechanism could lock the patient transport apparatus 100 in the stowed configuration WC while a different lock mechanism could lock the patient transport apparatus 100 in the stair configuration SC and/or the chair configuration CC. Other configurations are contemplated.

FIGS. 12A-12I successively depict exemplary steps of transporting a patient supported on the patient transport apparatus 100 down stairs ST. In FIG. 12A, a first caregiver is shown engaging the pivoting handle assemblies 130 in the engagement position 130B to illustrate approaching stairs ST while the patient transport apparatus 100 is moved along floor surfaces FS in the chair configuration CC. FIG. 12B depicts a second caregiver engaging the front handle assemblies 128 after having moved them to the extended position 128B. In FIG. 12C, the patient transport apparatus 100 has been moved closer to the stairs ST with the first caregiver still engaging the pivoting handle assemblies 130 and with the second caregiver still engaging the front handle assemblies 128. In FIG. 12D, the first caregiver has moved the handle assembly 132 to the extended position 132B as the second caregiver continues to engage the front handle assemblies 128.

In FIG. 12E, the first caregiver has engaged the deployment lock release 166 to move the patient transport apparatus 100 out of the chair configuration CC and into the stair configuration SC. Here, the track assemblies 154 are shown arranged between the retracted position 154A and the deployed position 154B, and the rear wheels 152 move closer to the front wheels 122, as the first caregiver pulls the track assemblies 154 away from the back section 106. In FIG. 12F, the patient transport apparatus 100 is shown in the stair configuration SC with the track assemblies 154 arranged in the deployed position 154B. Here, the rear wheels 152 are positioned significantly closer to the front wheels 122 compared to operation in the chair configuration CC, and are also arranged further under the seat section 104. It will be appreciated that transitioning the patient transport apparatus 100 from the chair configuration CC to the stair configuration SC has resulted in minimal patient movement relative to the support structure 102 as the carrier assembly 148 pivots about the hub axis HA and moves the rear wheels 152 closer to the front wheels 122 in response to movement of the track assemblies 154 to the deployed position 154B.

Furthermore, while the arrangement of patient's center of gravity has not changed significantly relative to the support structure 102, the longitudinal distance taken normal to gravity which extends between the patient's center of gravity and the location at which the rear wheels 152 contact the floor surface FS has shortened considerably. Because of this, the process of "tilting" the patient transport apparatus 100 (e.g., about the rear wheels 152) to transition toward contact between the track assemblies 154 and the stairs ST, as depicted in FIG. 12G, is significantly more comfortable for the patient than would otherwise be the case if the patient transport apparatus 100 were "tilted" about the rear wheels 152 from the chair configuration CC (e.g., with the rear wheels 152 positioned further away from the front wheels 122). Put differently, the arrangement depicted in FIG. 12G is such that the patient is much less likely to feel uncomfortable, unstable, or as if they are "falling backwards" during the "tilting" process. Here too, the caregivers are afforded with similar advantages in handling the patient transport apparatus 100, as the arrangement of the rear wheel 152 described above also makes the "tilting" process easier to control and execute.

It will also be appreciated that during the transitioning of the patient transport apparatus 100 from the chair configuration CC to the stair configuration SC, the oxygen container holder 10 has remained effectively secured to the intermediate support assembly 112 of the patient transport assembly 100 without any user adjustment, such as the removal of the holder 10 or a received oxygen container therefrom. Moreover, as the oxygen container holder 10 is centrally positioned under the patient and between the front support assembly 110 and rear support assembly 108, it reduces interference with the caregiver's operation of the patient transport apparatus 100 relative to other approaches like hanging an oxygen tank on the back of the patient transport apparatus 100. More specifically, the position of the oxygen container holder 10 is out of the way of the caregiver's operation of the patient transport apparatus 100, and provides less of an impact on the center of gravity of the patient and patient transport apparatus 100.

In FIG. 12H, the caregivers are shown continuing to support the patient transport apparatus 100 in the stair configuration SC as the belts 156 of the track assemblies 154 are brought into contact with the edge of the top stair ST. In FIG. 12I, the caregivers are shown continuing to support the patient transport apparatus 100 in the stair configuration SC as the belts 156 of the track assemblies 154 contact multiple stairs ST during descent.

Referring now to FIGS. 1-13B, as noted above, the patient transport apparatus 100 employs the carrier assembly 148 to, among other things, facilitate movement between the chair configuration CC, for traversing floor surfaces FS; and the stair configuration SC, for traversing stairs ST. Here, movement of the carrier assembly 148 from the chair configuration CC (see FIGS. 1, 6A, and 13A) to the stair configuration SC (see FIGS. 2, 6B, and 13B) simultaneously deploys the track assembly 154 for engaging stairs ST with the belt 156 by moving the track assembly 154 from the retracted position 154A to the deployed position 154B, and moves the wheel axis WA longitudinally closer to the front support assembly 110 so as to position the rear wheels 152 further underneath the seat section 104 and closer to the front wheels 122 as the carrier assembly 148 pivots about the hub axis HA.

As noted above, the movement of the rear wheels 152 relative to the front wheels 122 via the carrier assembly 148 described herein makes "tilting" the patient transport apparatus 100 significantly less burdensome for the caregivers and, at the same time, much more comfortable for the patient. Here, the arrangement of the rear wheels 152 relative to the front wheels 122 when operating in the chair configuration CC affords excellent stability when traversing floor surfaces FS, and the significantly different arrangement of the rear wheels 152 relative to the front wheels 122 when operating in the stair configuration SC optimizes the arrangement of the patient's center of gravity relative to the portion of the rear wheels 152 contacting the floor surface FS as the patient transport apparatus 100 is "tilted" backwards to transition into engagement with the stairs ST.

Figure 13A:
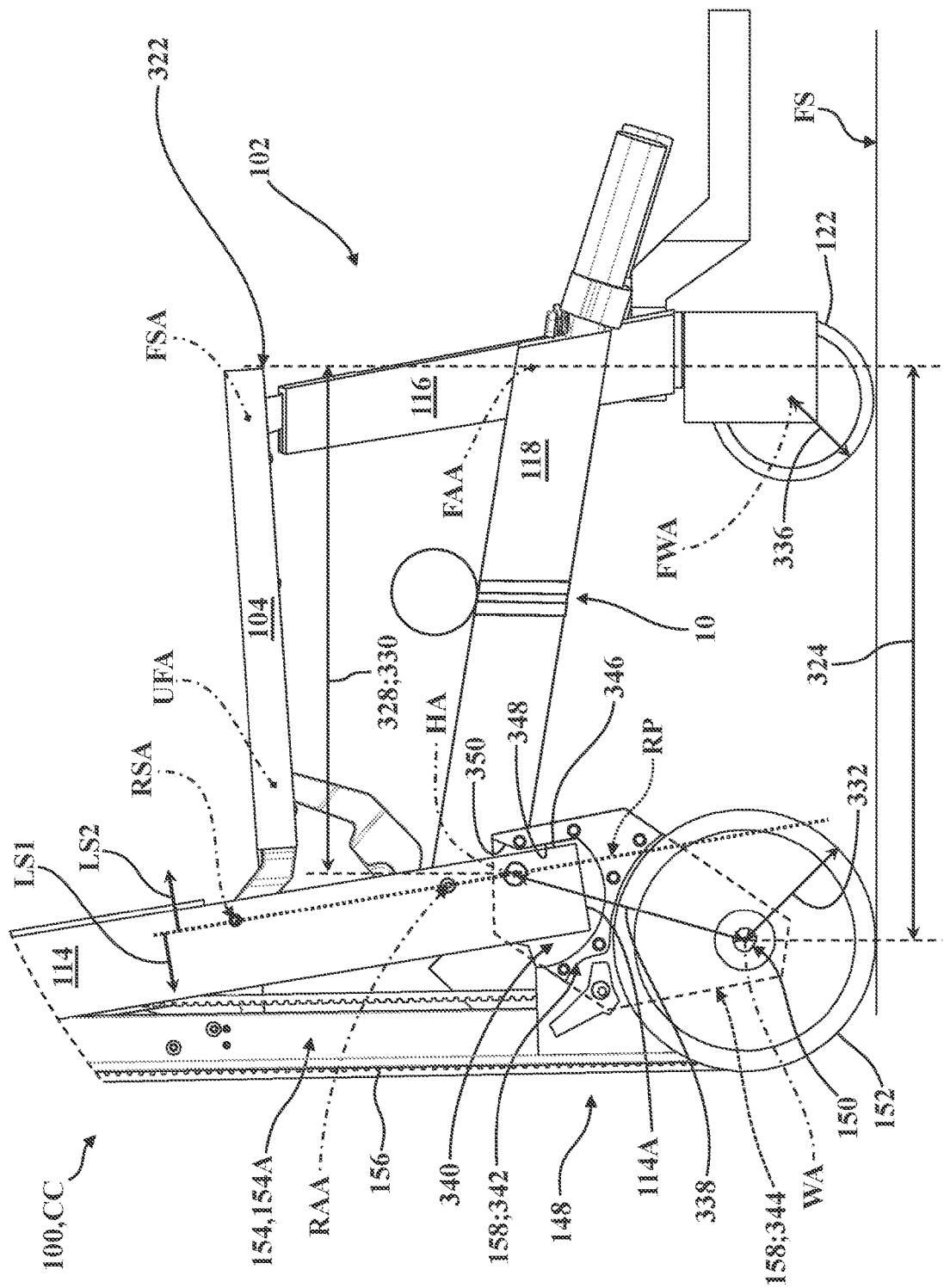
FIG. 13A is an enlarged, partial right-side plan view of the patient transport system of FIGS. 1-12I, with the patient transport apparatus shown arranged in the chair configuration.
Figure 13B:
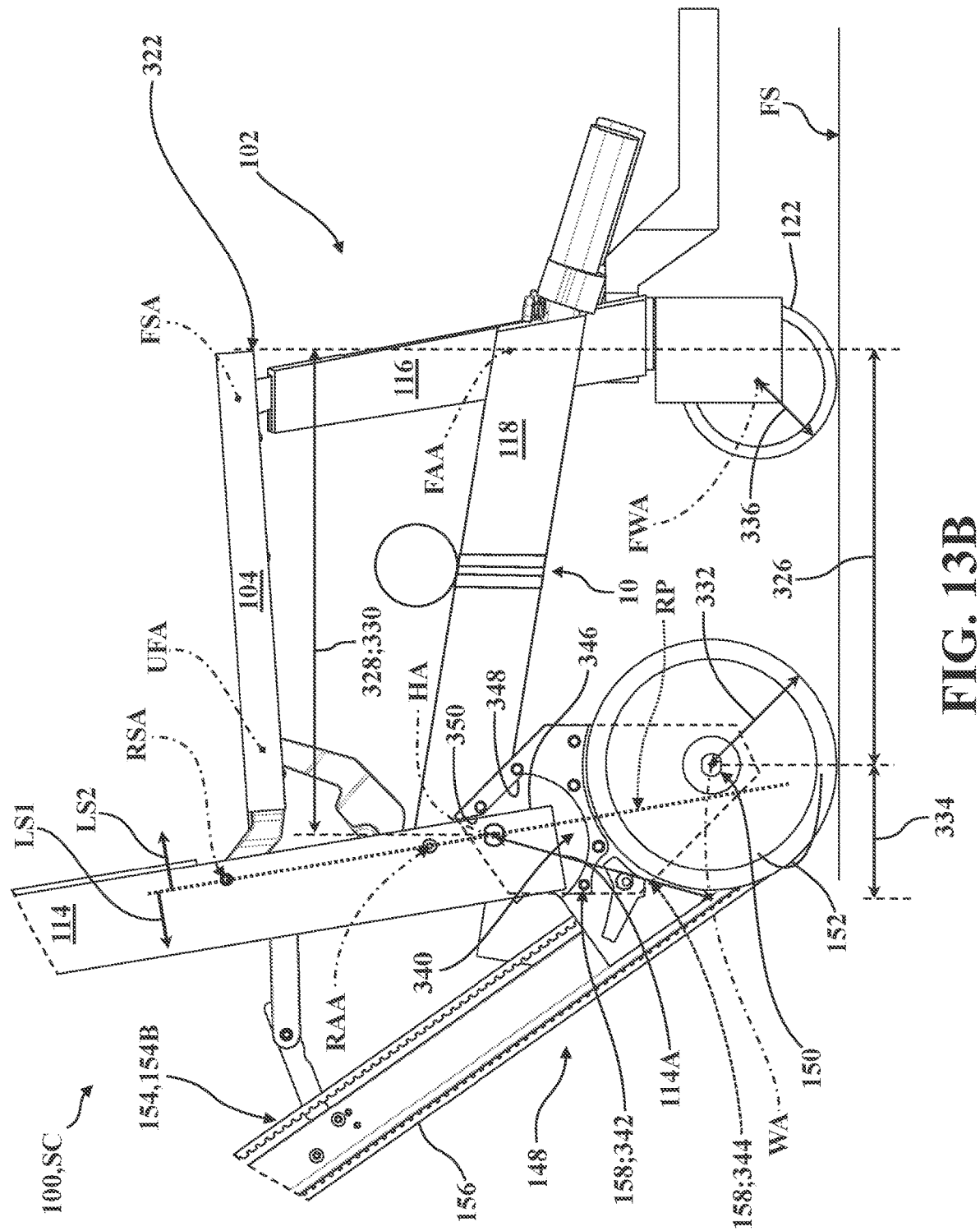
FIG. 13B is another enlarged, partial right-side plan view of the patient transport system of FIG. 13A, with the patient transport apparatus shown arranged in the stair configuration.

In some embodiments, the significantly different arrangement of the rear wheels 152 relative to the front wheels 122 between the chair configuration CC and the stair configuration SC described above can be defined based on an imaginary reference plane RP. As is best depicted in FIGS. 13A-13B, the hub axis HA extends through the reference plane RP, and the reference plane RP intersects the rear seat axis RSA and is fixed relative to the rear upright 114. The reference plane RP generally defines opposing first and second longitudinal sides LS1, LS2. The first longitudinal side LS1 of the reference plane RP faces towards the front of the patient transport apparatus 100 (e.g., toward the front support assembly 110), and the second longitudinal side LS2 of the reference plane RP faces towards the back of the patient transport apparatus 100 (e.g., away from the front support assembly 110). Here in this embodiment, movement of the carrier assembly 148 from the chair configuration CC to the stair configuration SC simultaneously deploys the track assembly 154 for engaging stairs ST, and moves the wheel axis WA from the first longitudinal side LS1 of the reference plane RP (see FIG. 13A) to the second longitudinal side LS2 of the reference plane RP (see FIG. 13B) to bring the rear wheel 152 closer to the front wheel 122 (compare FIGS. 13A-13B). In the representative embodiment illustrated herein, the rear arm axis RAA extends through the reference plane RP, and may be substantially parallel to the hub axis HA. However, other configurations are contemplated.

In some embodiments, the significantly different arrangement of the rear wheels 152 relative to the front wheels 122 between the chair configuration CC and the stair configuration SC described above can be defined based on the back section 106. As noted above, the back section 106 is operatively attached to the rear upright 114 of the support structure 102 in the illustrated embodiments. As is best depicted in FIG. 13A, at least a portion of the back section 106 is disposed longitudinally between the wheel axis WA and the front strut 116 when the carrier assembly 148 is arranged in the chair configuration CC. Here, movement of the carrier assembly 148 from the chair configuration CC to the stair configuration SC simultaneously deploys the track assembly 154 for engaging stairs ST, and moves the rear wheel 152 toward the front wheel 122 such that the wheel axis WA is disposed longitudinally between the back section 106 and the front strut 116 when the carrier assembly 148 is arranged in the stair configuration SC.

Referring now to FIGS. 13A-13B, the seat section 104 defines a front edge 322. In some embodiments, the wheel axis WA is spaced from the front edge 322 at a first longitudinal distance 324 when the carrier assembly 148 is arranged in the chair configuration CC (see FIG. 13A); and is spaced from the front edge 322 at a second longitudinal distance 326, smaller than the first longitudinal distance 324, when the carrier assembly 148 is arranged in the stair configuration SC (see FIG. 13B; compare with FIG. 13A).

In some embodiments, the hub axis HA is spaced from the front edge 322 at a first reference longitudinal distance 328 when the carrier assembly 148 is arranged in the chair configuration CC (see FIG. 13A); and is spaced from the front edge 322 at a second reference longitudinal distance 330, substantially equal to the first reference longitudinal distance 328, when the carrier assembly 148 is arranged in the chair configuration CC (see FIG. 13B, compare with FIG. 13A). Put differently, the hub axis HA remains substantially stationary relative to the seat section 104 as the carrier assembly 148 moves between the chair configuration CC and the stair configuration SC.

The first reference longitudinal distance 328 (or the second reference longitudinal distance 330) is larger than the second longitudinal distance 326 (see FIG. 13B), and the first reference longitudinal distance 328 (or the second reference longitudinal distance 330) is smaller than the first longitudinal distance 324 (see FIG. 13A). Put differently, the hub axis HA is arranged closer to the front edge 322 of the seat section 104 than the wheel axis WA is when the carrier assembly 148 is in the chair configuration CC, but the wheel axis WA is closer to the front edge 322 than the hub axis HA is when the carrier assembly 148 is in the stair configuration SC. As such, the center of gravity of the patient is positioned closer the wheel axis WA in the stair configuration SC than in the chair configuration CC.

With continued reference to FIGS. 13A-13B, in some embodiments, the rear wheel 152 defines a rear wheel radius 332, and an axle traversal distance 334 is be defined by subtracting the second longitudinal distance 326 from the first longitudinal distance 324 (compare FIGS. 13A-13B). The axle traversal distance 334 may be larger than or equal to the rear wheel radius 332. Put differently, the distance that the rear wheel 152 moves toward the front edge 322 as the carrier assembly 148 moves from the chair configuration CC to the stair configuration SC may be smaller than (or equal to) the rear wheel radius 332. As such, the rear wheel 152 is closer (in its entirety) to the front edge 322 in the stair configuration SC than in the chair configuration, which further positions the center of gravity of the patient closer to directly above the wheel axis WA in the stair configuration SC. In some embodiments, the front wheel 122 defines front wheel radius 336 that is larger than or equal to half of the rear wheel radius 332. Put differently, the rear wheels 152 may be larger in diameter than the front wheels 122 in some embodiments. In some embodiments, the wheel axis WA is spaced from the hub axis HA at a wheel spacing distance 338 that is larger than the rear wheel radius 332. This arrangement helps promote transitioning to the stair configuration SC as the rear wheels 152 remain in contact with floor surfaces FS by minimizing movement of the seat section 104 relative to the floor surface FS. However, other configurations are contemplated.

As noted above, the lower upright end 114A of the rear upright 114 is arranged adjacent to the hub axis HA, and the back section 106 is operatively attached to the rear upright 114 of the support structure 102 and generally extends downwardly past the seat section 104 toward the hub axis HA. In some embodiments, the hub 158 defines a pocket region 340 shaped to accommodate the lower upright end 114A therein as the carrier assembly 148 moves between the chair configuration CC and the stair configuration SC. The pocket region 340 provides space for relative movement of the upright 114 as the hub 158 pivots about the hub axis HA between the chair configuration CC and the stair configuration SC. As shown in FIGS. 13A-13B, the pocket may have generally arcuate configuration defined about the hub axis HA. However, the pocket may have any suitable shape, size, and configuration for allowing movement of the rear upright 114 within the pocket. In some embodiments, the hub 158 may comprise an inner hub body 342 and an outer hub body 344 (see FIGS. 1-2; not shown in detail) which is removably attachable to the inner hub body 342 (e.g., via fasteners; not shown). Here, the inner hub body 342 and the outer hub body 344 may cooperate to define the pocket region 340. In any event, it will be appreciated that the hubs 158 may each be formed as unitary components, or may be defined by multiple components operatively attached to each other. In the representative embodiments illustrated herein, the hub axis HA extends through the pocket region 340 of the hub 158. However, it is contemplated that the hub axis HA could be arranged in other ways relative to the pocket region 340 in some embodiments. Other configurations are contemplated.

With continued reference to FIGS. 13A-13B, in some embodiments, the rear upright 114 defines a front surface 346 facing generally towards the front strut 116, and the pocket region 340 of the hub 158 defines a first stop face 348 and a second stop face 350. The first stop face 348 is arranged adjacent to the front surface 346 of the rear upright 114 when the carrier assembly 148 is arranged in in chair configuration CC (see FIG. 13A). The second stop face 350 is arranged adjacent to the front surface 346 of the rear upright 114 when the carrier assembly 148 is arranged in the stair configuration SC (see FIG. 13B). Put differently, the first and second stop faces 348, 350 are angled relative to each other and are each disposed within or otherwise define a part of the pocket region 340 of the hub 158 (compare FIGS. 13A-13B).

Figure 14:
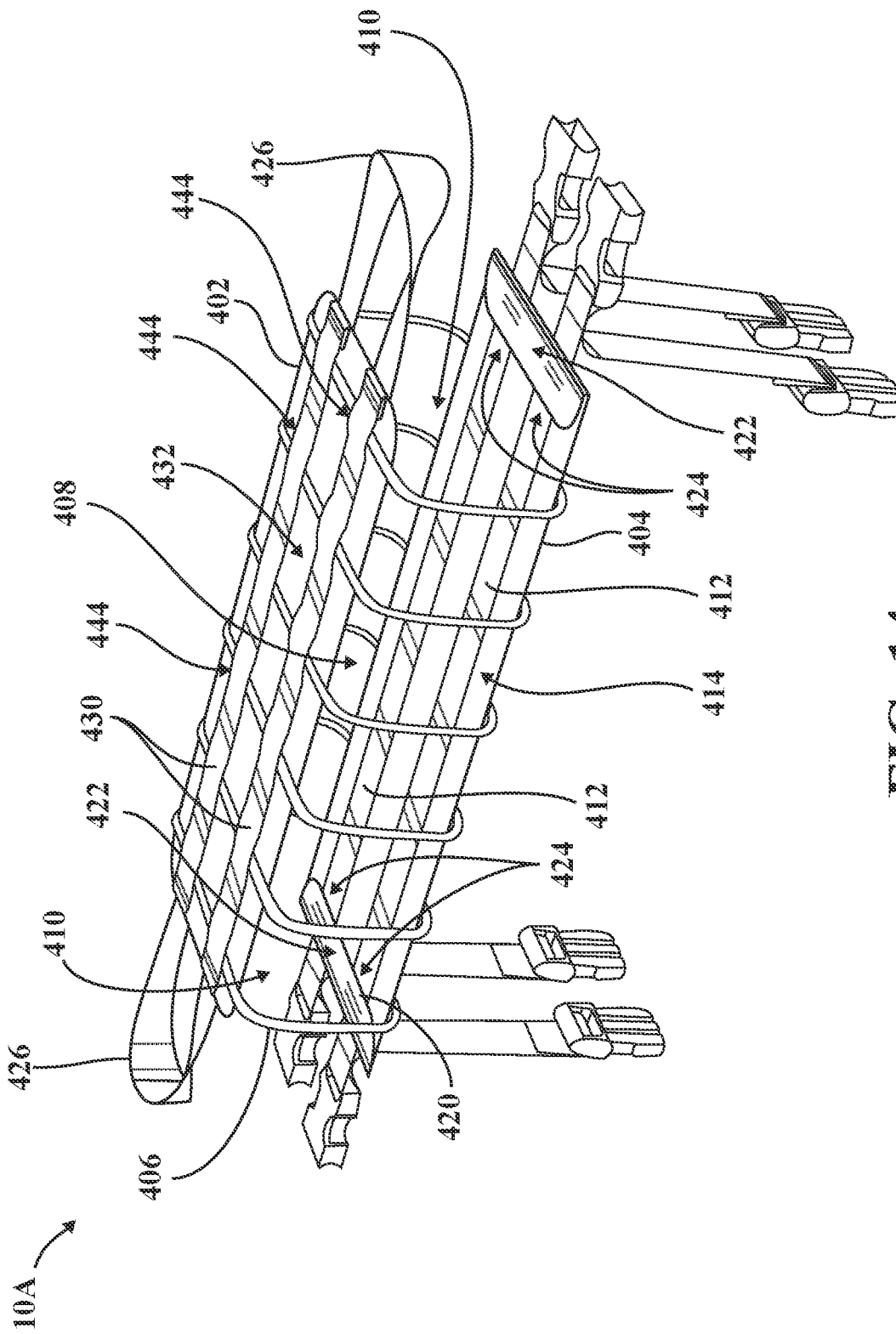
FIG. 14 is a perspective view of an example implementation of the collapsible oxygen container holder of FIG. 1 showing a top of the holder.
Figure 15:
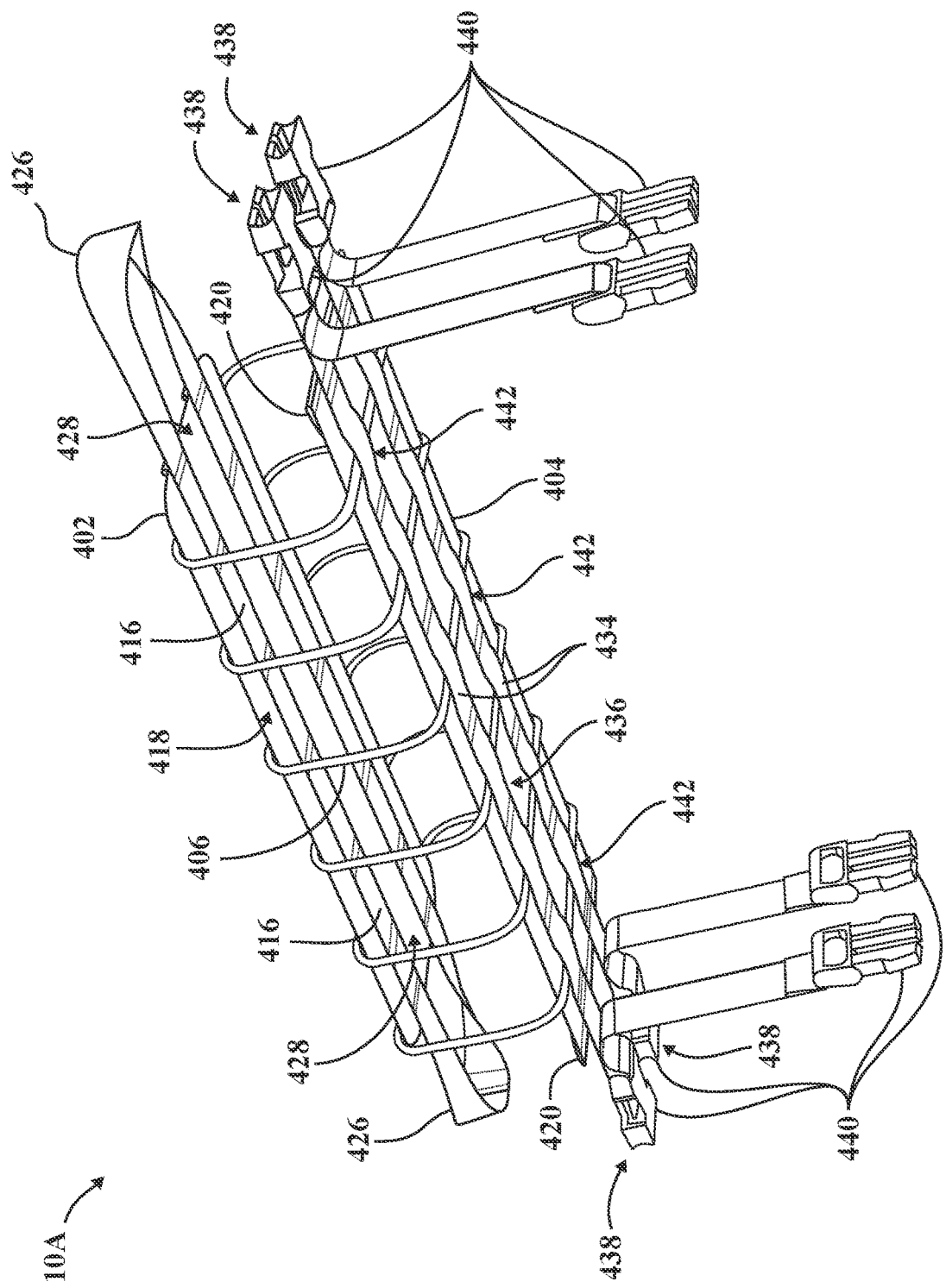
FIG. 15 is a perspective view of the collapsible oxygen container holder of FIG. 14 showing a bottom of the holder.

Referring now to FIGS. 14 and 15, an exemplary implementation of the oxygen container holder 10 is provided. The illustrated exemplary oxygen container holder 10A includes an elongated upper panel 402 and an elongated lower panel 404 diametrically opposed to one another. The lateral length of the upper panel 402 may be less than a lateral length of the lower panel 404. A flexible interface 406 extends between the upper panel and the lower panel 402, 404 to form an expandable compartment 408 therebetween, with the expandable compartment 408 including one or more openings 410, such as two laterally opposed openings 410, for receiving an oxygen container into the expandable compartment 408 in the lateral direction.

A plurality of lower sliding strips 412 extend laterally along an interior surface 414 of the lower panel 404, and a plurality of upper sliding strips 416 extend laterally along an interior surface 418 of the upper panel. In some implementations, a width of each of the lower sliding strips 412 and/or upper sliding strips 416 may be less than 25% of a width of the lower panel 404 and/or upper panel 402, respectively. Each sliding strip 412, 416 may be constructed from webbing-based material, and may be configured to provide a decreased frictional force relative to its associated panel 402, 404 when receiving the oxygen container within the expandable compartment 408. In this way, the sliding strips 412, 416 may function as "pontoons" designed to reduce friction and ease the insertion and removal of an oxygen container into and from the expanded compartment 408.

At least one of the panels 402, 404, such as the lower panel 404, may include one or more hems 420 adjacent the opening(s) 410 of the expandable compartment 408. For instance, the lower panel 404 may include diametrically opposed lateral portions 422 that are each folded over adjacent ends 424 of the lower sliding strips 412 and secured to the lower panel 404 to form the hem 420, which is configured to abut the oxygen container when received in the expandable compartment 408. More specifically, the hem(s) 420, which may define lateral portions of the expandable compartment 408, may be urged by the flexible interface 406 to contact the oxygen container when received in the expandable compartment, thus create a friction with the oxygen container adjacent the openings 410 of the expanded compartment 408 to resist movement of the oxygen container within and out of the holder 10 absent force being applied to the holder 10 to separate the hem(s) 420 from the oxygen container.

To this end, the oxygen container holder 10A may also at least one handle 426 extending from the upper panel 402. Each handle 426 may be disposed adjacent one of the openings 410 of the expandable compartment 408, and may be interacted with by a user to separate the upper panel 402 from the lower panel 404, or more particularly from the hem 420 aligned with the handle 426, so as to increase the size of the adjacent opening 410 to facilitate insertion and removal of an oxygen container into and from the oxygen container holder 10A. For instance, the oxygen container holder 10A may include two handles 426, each extending from an opposed lateral portion 428 of the interior surface 418 of the upper panel 402 that is adjacent a opening 410, for lifting the opposed lateral portion 428 of the upper panel relative to the lower panel 404. In this way, when the oxygen container holder 10A is secured to a patient transport apparatus 100, the oxygen container can be inserted or removed from oxygen container holder 10A from either lateral side of the patient transport apparatus 100.

In some instances, the handles 426 may be defined by the upper sliding strips 416. More specifically, each upper sliding strip 416 may include an end portion extending beyond a lateral portion 428 of the upper panel 402 and joined with the corresponding end portion of another upper sliding strip 416 to form the handle 426. In some instances, both end portions of each upper sliding strip 416 may extend in this way so as to form a handle 426 adjacent each opening 410 of the oxygen container holder 10A. In other examples, the upper sliding strips 416 may be formed from a single continuous strip that is folded along its length to define a handle 426 adjacent a opening 410 of the oxygen container holder 10A. Another handle 426 may then be formed adjacent the other opening 410 of the oxygen container holder 10A by the free ends of the continuous strip extending beyond the lateral portion 428 of the upper panel 402 adjacent the other opening 410 and being joined together.

The oxygen container holder 10A also includes a plurality of upper straps 430 extending laterally along an exterior surface 432 of the upper panel 402, and includes a plurality of support straps 434 extending laterally along an exterior surface 436 of the lower panel 404. The handle(s) 426 and/or upper sliding strips 416 may be coupled (e.g., stitched) to the upper straps 430 through the upper panel 402, and/or the support straps 434 may be coupled (e.g., stitched) to the lower sliding strips 412 through the lower panel 404, which acts to reinforce the stitching of each. The upper straps 430 and support straps 434 may be made of a webbing-based strap material.

Figure 16:
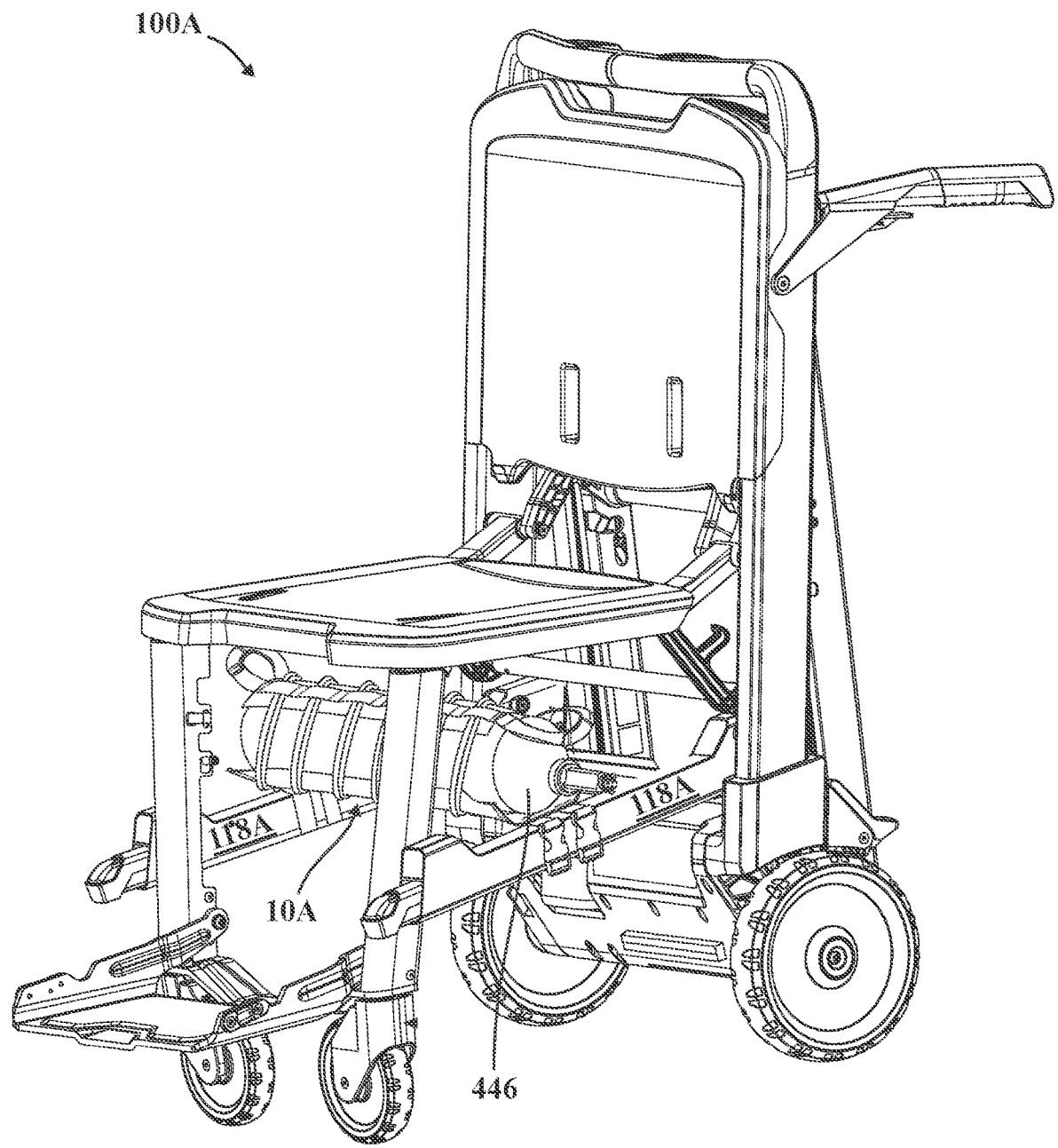
FIG. 16 is a perspective view of an example implementation of a patient transport system with the collapsible oxygen container holder of FIGS. 14 and 15.

The support straps 434 are configured to releasably connect the oxygen container holder 10A to a patient transport apparatus 100 and prevent a received oxygen container from moving or rolling. To this end, the support straps 434 each includes opposed end portions 438 extending beyond the opposed lateral portions 422 of the lower panel 404 for securing the oxygen container holder 10 to the support structure 102 of the patient transport apparatus 100. More particularly, each end portion 438 may include a coupler 440, such as a buckle, for releasable engagement with the arms 118 of the intermediate support assembly 112. Each support strap 434 may be sized such that they are in tension when secured to the arms 118 so as to support the weight of the oxygen container therebetween. FIG. 16 illustrates the exemplary oxygen container holder 10A coupled to the arms 118A of an exemplary patient transport apparatus 100A using the couplers 440.

Each of the support straps 434 may also define a plurality of passages 442 between the exterior surface 436 of the lower panel 404 and the support strap 434 for lacing the flexible interface 406, which may take the form of an elastic cord (e.g., elastic shock cord webbing), around the upper panel 402 and lower panel 404, such as to surge the upper panel and lower panel 404 towards one another when the flexible interface 406 is stretched. Additionally or alternatively, each of the upper straps 430 may define a plurality of passages 444 between the exterior surface 432 of the upper panel 402 and the support strap 434 for lacing the flexible interface 406. The flexible interface 406 may be sized to accommodate different sizes of oxygen containers. For example, the flexible interface 406 may be sized so as to define the expandable compartment 408 to provide sufficient tension for retaining a size-D oxygen container, and that can expand elastically to fit a size-JD oxygen container. Additionally or alternatively, the flexible interface 406 may be realized by a cord that is laced around the upper panel 402 and lower panel 404 and includes a handle for interaction by a user to tighten the cord around upper panel 402 and lower panel 402 to urge the same towards contact with a received oxygen container.

Figure 17A:
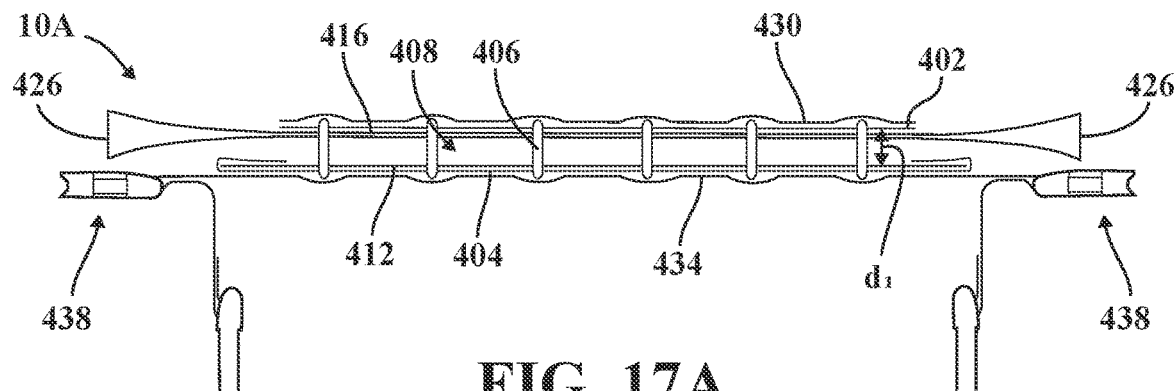
FIGS. 17A-17C are front views of the collapsible oxygen container holder of FIGS. 14 and 15 in a collapsed state, an expanded state where an upper panel of the collapsible holder is spaced from a lower panel of the collapsible holder by a distance for receiving an oxygen holder, and another expanded state where the upper panel is spaced from the lower panel at a lesser distance with at least a portion of each of the upper panel and the lower panel abutting the outer surface of the oxygen container, respectively.
Figure 17B:
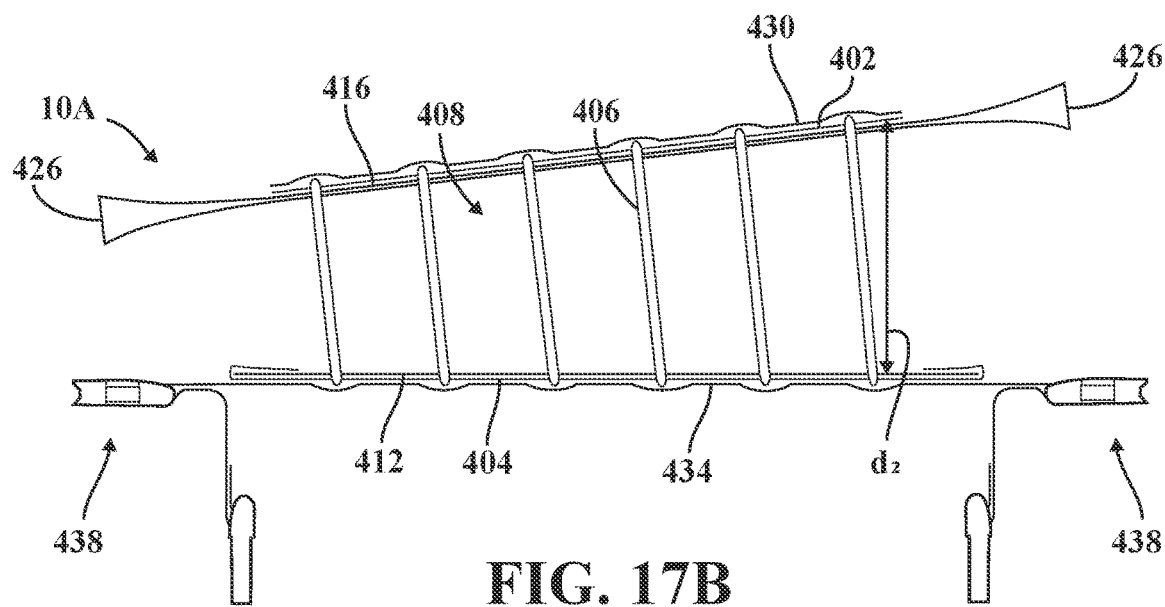
Figure 17C:
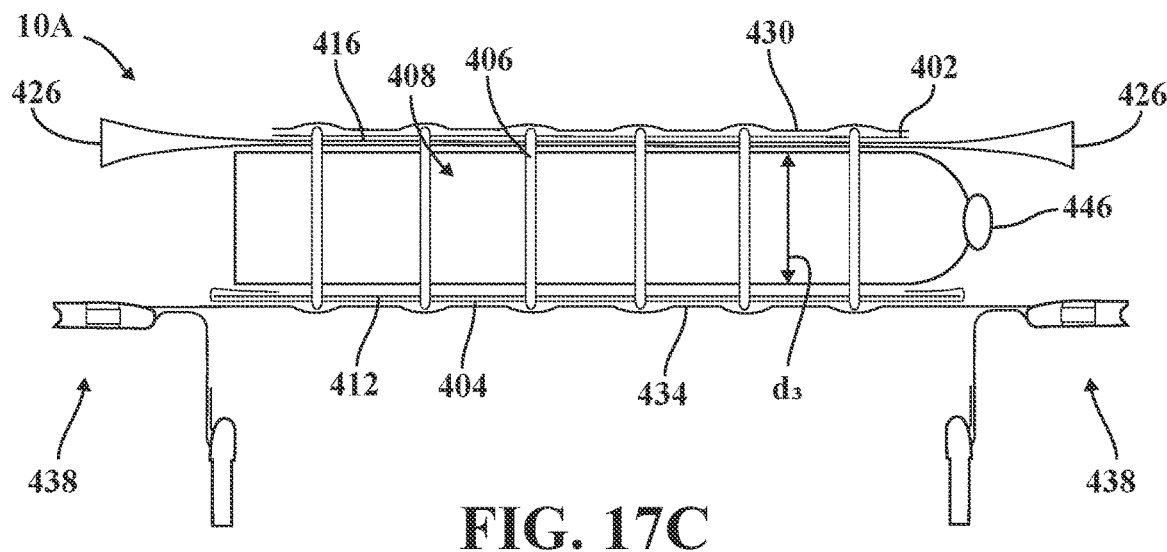
Figure 18:
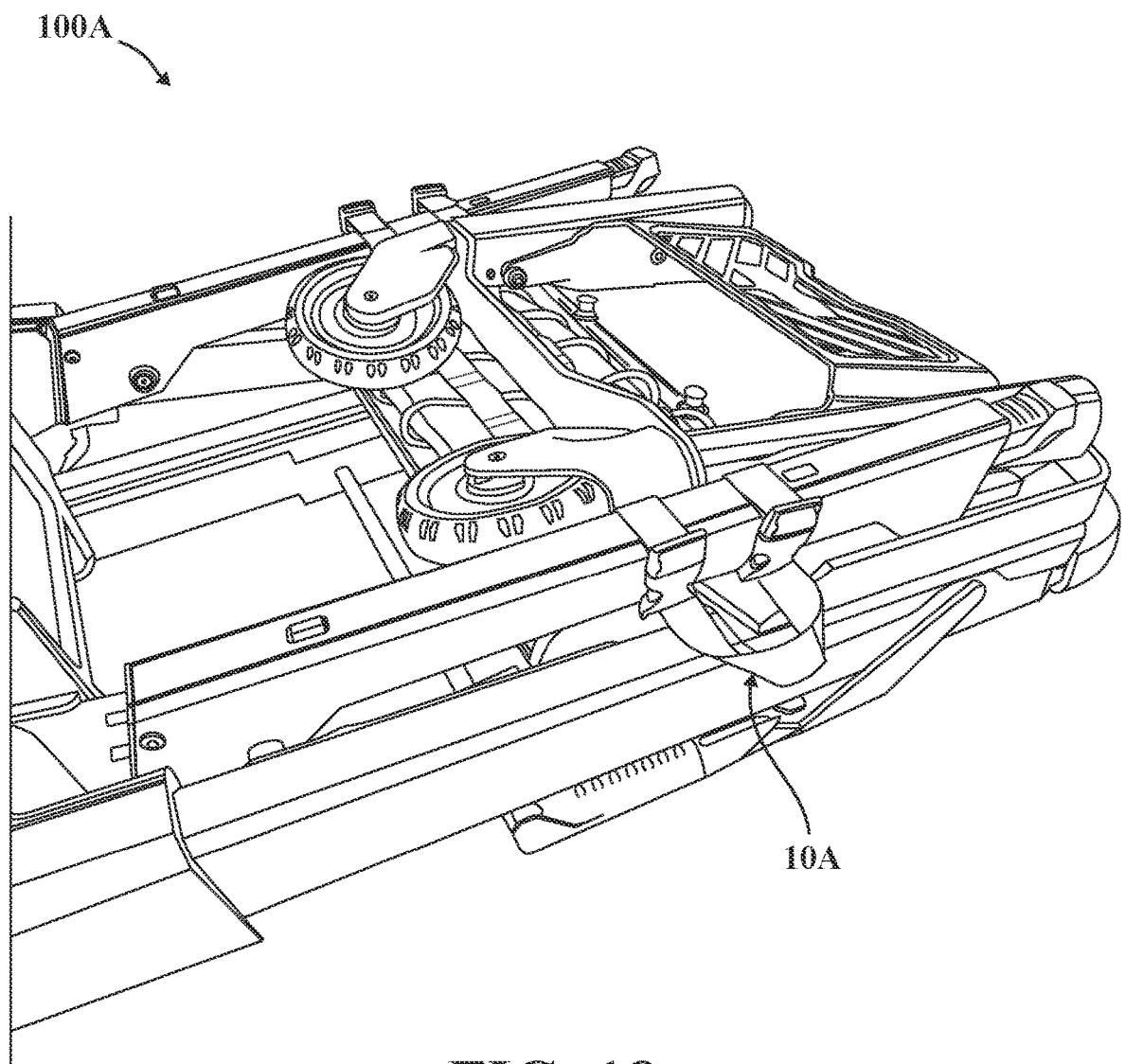
FIG. 18 is a partial perspective view of the patient transport system of FIG. 16 shown in a stowed configuration without collapsible oxygen container holder being removed.

Referring now to FIG. 17A-C, the oxygen container holder 10A, or more particularly the expandable compartment 408, is moveable between varying states so as to facilitate its operation. FIG. 17 illustrates a collapsed state in which an oxygen container is not present in the expandable compartment 408 and the lower panel 404 abuts or is adjacent the upper panel 404 (e.g., within a distance d1 of each other). When the patient transport apparatus 100 is placed in the stowed configuration as described above, the expandable compartment 408 may be urged to the collapsed state so as to not to interfere with the folding mechanisms of the patient transport apparatus 100.

FIG. 17B illustrates the expandable compartment 408 in an expanded state in which the upper panel 402 is spaced from the lower panel 404 at a relatively large distance d2 to receive an oxygen container in sliding engagement with the lower sliding strips 412 and/or upper sliding strips 416. The expandable compartment 408 may be placed in this state by a user interfacing with the handle 426 when the oxygen container holder 10 is secured to the patient transport apparatus 100 to lift the upper panel 402 from the lower panel 404.

FIG. 17C illustrates the expandable compartment 408 in another expanded state in which the upper panel 402 is spaced from the lower panel 404 at distance d3 less than the distance d2 and greater than the distance d1 such that at least a portion of each of the upper panel 402 and lower panel 404 abuts the outer surface of the oxygen container 446, which functions to retain the oxygen container 446 within the expandable compartment 408. In other words, the distance d3 may generally correspond to the diameter of the oxygen container 446.

The present disclosure describes an oxygen container holder for a patient transport apparatus that is designed so that manual tensioning adjustments are limited or avoided and installation can occur in multiple orientations. The oxygen container holder may be configured to be held underneath the seat of the patient transport apparatus to prevent the holder from interfering with any chair mechanisms as well as to prevent a regulator from being damaged by the wheels. The holder's design may also be such that the holder can remain on the patient transport apparatus when folded. Therefore the operator does not need to remove the holder when not in use. These and several other benefits are described throughout the above disclosure.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:
1. A patient transport system comprising:
   a patient transport apparatus including:
      a support structure,
      a seat section and a back section coupled to the support structure and defining a support surface for supporting a patient, a plurality of wheels coupled to the support structure for traversing floor surfaces, and
a track assembly extending from the support structure and having a belt for traversing stairs; and
a collapsible holder for removably receiving an oxygen container, the holder attached to the support structure and comprising:
an elongated upper panel and an elongated lower panel,
a flexible interface extending between the upper panel and the lower panel to form an expandable compartment with an opening for receiving the oxygen container in a lateral direction, and
a plurality of lower sliding strips extending laterally along an interior surface of the lower panel, the lower sliding strips configured to provide a decreased frictional force relative to the lower panel when receiving the oxygen container within the expandable compartment,
wherein the expandable compartment is moveable between:
a first expanded state where the upper panel is spaced from the lower panel at a first distance to receive the oxygen container in sliding engagement with the lower sliding strips, and
a second expanded state where the upper panel is spaced from the lower panel at a second distance less than the first distance and at least a portion of each of the upper panel and the lower panel abuts the oxygen container.

2. The patient transport system of claim 1, wherein the lower sliding strips each includes an end adjacent the opening, and a lateral portion of the lower panel adjacent the opening is folded over the ends of the lower sliding strips to form a hem adjacent the opening that abuts the oxygen container when the expandable compartment is in the second expanded state to retain the oxygen container in the lateral direction.

3. The patient transport system of claim 1, wherein the flexible interface comprises an elastic cord configured to urge the upper panel and the lower panel towards each other.

4. The patient transport system of claim 1, wherein the flexible interface comprises a cord laced around the upper panel and the lower panel and configured to urge the upper panel and the lower panel toward each other in response to user engagement with the cord.

5. The patient transport system of claim 4, wherein the collapsible holder further comprises a plurality of upper straps extending laterally along an exterior surface of the upper panel and defining a plurality of passages between the upper panel and the upper straps for lacing the cord around the upper panel and the lower panel.

6. The patient transport system of claim 5, wherein the collapsible holder further comprises a handle extending from a lateral portion of an interior surface of the upper panel that is adjacent the opening, the handle being secured to the upper straps through the upper panel.

7. The patient transport system of claim 1, wherein the collapsible holder further comprises upper sliding strips extending laterally along an interior surface of the upper panel, the upper sliding strips configured to provide a decreased frictional force relative to the upper panel when receiving the oxygen container within the expandable compartment.

8. The patient transport system of claim 7, wherein the upper sliding strips further define a handle extending from a lateral portion of the interior surface of the upper panel adjacent the opening.

9. The patient transport system of claim 1, wherein the collapsible holder further comprises a plurality of support straps extending laterally along an exterior surface of the lower panel, the support straps each including opposed first and second end portions extending respectively beyond first and second opposed lateral ends of the lower panel for securing the collapsible holder to the support structure of the patient transport apparatus.

10. The patient transport system of claim 9, wherein the support structure comprises a rear support assembly, a front support assembly, and an intermediate support assembly, the intermediate support assembly including laterally spaced first and second apart arms extending between the front support assembly and the rear support assembly; and
wherein the first end portions of the support straps each includes a coupler for releasable engagement with the first arm and the second end portions of the support straps each includes a coupler for releasable engagement with the second arm.

11. The patient transport system of claim 1, wherein the expandable compartment is further moveable between the first and second expanded states and a collapsed state in which the lower panel abuts the upper panel, and the collapsible holder further comprises a handle extending from a lateral portion of an interior surface of the upper panel adjacent the opening for moving the expandable compartment from the collapsed state to the first expanded state and for moving the expandable compartment from the second expanded state to the first expanded state.

12. The patient transport system of claim 1, wherein the lateral length of the upper panel is less than the lateral length of the lower panel.

13. The patient transport system of claim 1, wherein a width of each of the lower sliding strips is less than 25% of a width of the lower panel.

14. The patient transport system of claim 1, wherein the patient transport apparatus is moveable between a patient support configuration and a stowed configuration without removing the collapsible holder from the patient transport apparatus.

15. A collapsible holder for receiving an oxygen container and configured to be attached to a support structure of a patient transport apparatus, the collapsible holder comprising:
an elongated upper panel and an elongated lower panel,
a flexible interface extending between the upper panel and the lower panel to form an expandable compartment with an opening for receiving the oxygen container in a lateral direction, and
a plurality of lower sliding strips extending laterally along an interior surface of the lower panel, the lower sliding strips configured to provide a decreased frictional force relative to the lower panel when receiving the oxygen container within the expandable compartment,
wherein the expandable compartment is moveable between:
a first expanded state where the upper panel is spaced from the lower panel at a first distance to receive the oxygen container in sliding engagement with the lower sliding strips, and
a second expanded state where the upper panel is spaced from the lower panel at a second distance less than the first distance and at least a portion of each of the upper panel and the lower panel abuts the oxygen container.

* * * * *